United States Patent
Chiba et al.

(10) Patent No.: US 7,423,714 B2
(45) Date of Patent: Sep. 9, 2008

(54) POLARIZING PLATE PROVIDED WITH OPTICAL COMPENSATION LAYERS AND IMAGE DISPLAY APPARATUS USING THE SAME

(75) Inventors: Tsuyoshi Chiba, Osaka (JP); Hiroyuki Okada, Osaka (JP); Yoshitsugu Kitamura, Osaka (JP); Shunsuke Shutou, Osaka (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 36 days.

(21) Appl. No.: 10/580,420

(22) PCT Filed: Nov. 25, 2005

(86) PCT No.: PCT/JP2005/021677

§ 371 (c)(1),
(2), (4) Date: Feb. 8, 2007

(87) PCT Pub. No.: WO2006/059545

PCT Pub. Date: Jun. 8, 2006

(65) Prior Publication Data

US 2007/0222919 A1    Sep. 27, 2007

(30) Foreign Application Priority Data

Dec. 2, 2004 (JP) .............................. 2004-349387
Mar. 31, 2005 (JP) .............................. 2005-100958

(51) Int. Cl.
*G02F 1/1335* (2006.01)
(52) U.S. Cl. .................. 349/119; 349/117; 349/118
(58) Field of Classification Search .............. 349/117, 349/119
See application file for complete search history.

(56) References Cited

U.S. PATENT DOCUMENTS 6,281,952 B1    8/2001    Okamoto et al.

(Continued)

FOREIGN PATENT DOCUMENTS

JP    10-68816    3/1998

(Continued)

OTHER PUBLICATIONS

International Search Report of PCT/JP2005/021677, mailing date Feb. 14, 2006.

*Primary Examiner*—M. R. Connelly-Cushwa
*Assistant Examiner*—Rhonda S Peace
(74) *Attorney, Agent, or Firm*—Westerman, Hattori, Daniels & Adrian, LLP.

(57) ABSTRACT

To provide a polarizing plate provided with optical compensation layers capable of contributing to thickness reduction, preventing uneven display due to heat, and favorably preventing light leak in black display, and an image display apparatus using the same. The polarizing plate provided with optical compensation layers of the present invention includes a polarizer, a first optical compensation layer, a second optical compensation layer, and a third optical compensation layer in the stated order. The first optical compensation layer, the second optical compensation layer, and the third optical compensation layer each have predetermined absolute value of photoelastic coefficient, refractive index profile, and in-plane retardation and/or thickness direction retardation. An absorption axis of the polarizer and a slow axis of the first optical compensation layer form an angle of 10° to 30°. The absorption axis of the polarizer and a slow axis of the second optical compensation layer form an angle of 70° to 95°. The absorption axis of the polarizer and a slow axis of the third optical compensation layer form an angle of 70° to 95°.

20 Claims, 2 Drawing Sheets

U.S. PATENT DOCUMENTS

| | | |
|---|---|---|
| 6,624,862 B1 * | 9/2003 | Hayashi et al. ............. 349/119 |
| 6,717,637 B1 | 4/2004 | Yoon et al. |
| 6,888,599 B2 * | 5/2005 | Kawamoto et al. .......... 349/118 |
| 6,922,222 B2 * | 7/2005 | Miyachi et al. ............. 349/118 |
| 7,012,663 B2 * | 3/2006 | Ono et al. ................... 349/118 |
| 7,126,657 B2 * | 10/2006 | Okumura .................... 349/114 |
| 2001/0007487 A1 | 7/2001 | Yoon et al. |
| 2001/0052948 A1 | 12/2001 | Okamoto et al. |
| 2002/0080310 A1 * | 6/2002 | Nakamura et al. .......... 349/117 |
| 2003/0067574 A1 | 4/2003 | Sasaki et al. |
| 2003/0210362 A1 | 11/2003 | Yoon et al. |
| 2004/0227876 A1 | 11/2004 | Okumura |
| 2005/0243248 A1 | 11/2005 | Yoon et al. |
| 2006/0238681 A1 * | 10/2006 | Murakami et al. .......... 349/117 |
| 2006/0268208 A1 * | 11/2006 | Murakami et al. .......... 349/117 |
| 2007/0076155 A1 * | 4/2007 | Nakayama et al. .......... 349/118 |

FOREIGN PATENT DOCUMENTS

| | | |
|---|---|---|
| JP | 11-242226 A | 9/1999 |
| JP | 2001-209065 A | 8/2001 |
| WO | WO 2004/090590 | 10/2004 |

* cited by examiner

POLARIZING PLATE PROVIDED WITH OPTICAL COMPENSATION LAYERS AND IMAGE DISPLAY APPARATUS USING THE SAME

TECHNICAL FIELD

The present invention relates to a polarizing plate provided with optical compensation layers, and to an image display apparatus using the same. In particular, the present invention relates to a polarizing plate provided with optical compensation layers capable of contributing to thickness reduction, preventing uneven display due to heat, and favorably preventing light leak in black display, and to an image display apparatus using the same.

BACKGROUND ART

There is proposed a semi-transmissive reflective liquid crystal display apparatus as a liquid crystal display apparatus of VA mode, in addition to a transmissive liquid crystal display apparatus and a reflective liquid crystal display apparatus (see JP 11-242226 A and JP 2001-209065 A, for example). The semi-transmissive reflective liquid crystal display apparatus utilizes outside light in the same manner as in the reflective liquid crystal display apparatus in a bright place, and allows visualization of display with an internal light source such as backlight in a dark place. That is, the semi-transmissive reflective liquid crystal display apparatus employs a display system combining reflective mode and transmissive mode, and switches display mode to reflective mode or transmissive mode in accordance with brightness of its environment. As a result, the semi-transmissive reflective liquid crystal display apparatus can provide a clear display even in a dark environment while reducing power consumption, and thus is suitably used for a display part of a portable device.

A specific example of such a semi-transmissive reflective liquid crystal display apparatus is a liquid crystal display apparatus including on an inner side of a lower substrate a reflective film which has a window part for light transmission formed on a metal film of aluminum or the like and which serves as a semi-transmissive reflecting plate. In a liquid crystal display apparatus of reflective mode, outside light entering from an upper substrate side passes through a liquid crystal layer, reflects on a reflective film on an inner side of the lower substrate, passes through the liquid crystal layer again, and exits from the upper substrate side, to thereby contribute in display. Meanwhile, in a liquid crystal display apparatus of transmissive mode, light from backlight entering from the lower substrate side passes through the window part of the reflective film and through the liquid crystal layer, and exits from the upper substrate side, to thereby contribute in display. Thus, of a reflective film-formed region, a region having the window part formed becomes a transmissive display region, and the remaining region becomes a reflective display region.

However, in a conventional reflective or semi-transmissive liquid crystal display apparatus of VA mode, problems of light leak in black display and reduction in contrast have not been solved for a long period of time.

DISCLOSURE OF THE INVENTION

Problems to be Solved by the Invention

The present invention has been made in view of solving the conventional problems described above, and an object of the present invention is therefore to provide a polarizing plate provided with optical compensation layers capable of contributing to thickness reduction, preventing uneven display due to heat, and favorably preventing light leak in black display, and an image display apparatus using the same.

Means for Solving the Problems

A polarizing plate provided with optical compensation layers according to an embodiment of the present invention includes a polarizer, a first optical compensation layer, a second optical compensation layer, and a third optical compensation layer in the stated order. The first optical compensation layer contains a resin having an absolute value of photoelastic coefficient of $2 \times 10^{-11}$ m$^2$/N or less, and has a relationship of nx>ny=nz and an in-plane retardation $Re_1$ of 200 to 300 nm; the second optical compensation layer contains a resin having an absolute value of photoelastic coefficient of $2 \times 10^{-11}$ m$^2$/N or less, and has a relationship of nx>ny=nz and an in-plane retardation $Re_2$ of 90 to 160 nm; and the third optical compensation layer has a relationship of nx=ny>nz, an in-plane retardation $Re_3$ of 0 to 20 nm, and a thickness direction retardation $Rth_3$ of 30 to 300 nm. An absorption axis of the polarizer and a slow axis of the first optical compensation layer form an angle of 10° to 30°; the absorption axis of the polarizer and a slow axis of the second optical compensation layer form an angle of 70° to 95°; and the absorption axis of the polarizer and a slow axis of the third optical compensation layer form an angle of 70° to 95°.

In one embodiment of the invention, the third optical compensation layer has a thickness of 1 to 50 µm.

In another embodiment of the invention, the third optical compensation layer is formed of a cholesteric alignment fixed layer having a selective reflection wavelength region of 350 nm or less.

Alternatively, the third optical compensation layer includes a layer formed of a film having a relationship of nx=ny>nz and containing a resin having an absolute value of photoelastic coefficient of $2 \times 10^{-1}$ m$^2$/N or less and a cholesteric alignment fixed layer having a selective reflection wavelength region of 350 nm or less.

According to another aspect of the invention, a liquid crystal panel is provided. The liquid crystal panel includes the above-described polarizing plate provided with optical compensation layers, and a liquid crystal cell.

In one embodiment of the invention, the liquid crystal cell is of reflective or semi-transmissive VA mode.

According to still another aspect of the invention, a liquid crystal display apparatus is provided. The liquid crystal display apparatus includes the above-described liquid crystal panel.

According to still another aspect of the invention, an image display apparatus is provided. The image display apparatus includes the above-described polarizing plate provided with optical compensation layers.

Effect of the Invention

As described above, according to the present invention, the angle formed between the absorption axis of the polarizer and the slow axis of each of the first optical compensation layer (λ/2 plate), the second optical compensation layer (λ/4 plate), and the third optical compensation layer (negative C plate) is set within a predetermined range, to thereby significantly improve light leak in black display in a reflective and semi-transmissive liquid crystal display apparatus of VA mode, in particular. The third optical compensation layer (negative C plate) is formed of a cholesteric alignment fixed layer by using a liquid crystal material and a chiral agent, to thereby drastically reduce its thickness compared with that of a conventional negative C plate. As a result, the present invention may greatly contribute to reduction in thickness of an image display apparatus. Further, by reducing the thickness of the third optical compensation layer (negative C plate), uneven display due to heat may be significantly prevented.

Figure 1:
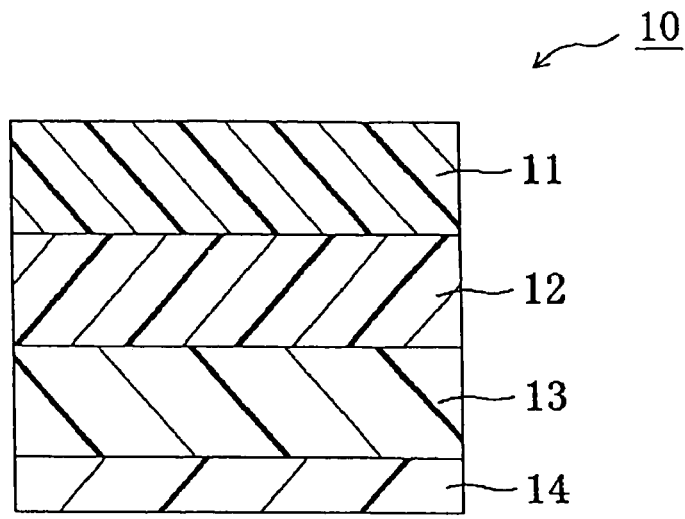
FIG. 1 A schematic sectional view of a polarizing plate provided with optical compensation layers according to a preferred embodiment of the present invention.

DESCRIPTION OF REFERENCE NUMERALS 10 polarizing plate provided with optical compensation layers
11 polarizer
12 first optical compensation layer
13 second optical compensation layer
14 third optical compensation layer
20 liquid crystal cell
100 liquid crystal panel

BEST MODE FOR CARRYING OUT THE INVENTION (Definitions of Terms and Symbols)

Definitions of terms and symbols in the specification of the present invention are described below.

(1) The symbol "nx" refers to a refractive index in a direction providing a maximum in-plane refractive index (that is, a slow axis direction), and the symbol "ny" refers to a refractive index in a direction perpendicular to the slow axis in the same plane (that is, a fast axis direction). The symbol "nz" refers to a refractive index in a thickness direction. Further, the expression "nx=ny", for example, not only refers to the case where nx and ny are exactly equal but also includes the case where nx and ny are substantially equal. In the specification of the present invention, the phrase "substantially equal" includes the case where nx and ny differ within a range providing no effects on overall polarization properties of a polarizing plate provided with optical compensation layers in practical use.

(2) The term "in-plane retardation Re" refers to an in-plane retardation value of a film (layer) measured at 23° C. by using light of a wavelength of 590 nm. Re can be determined from an equation Re=(nx−ny)×d, where nx and ny represent refractive indices of a film (layer) at a wavelength of 590 nm in a slow axis direction and a fast axis direction, respectively, and d (nm) represents a thickness of the film (layer).

(3) The term "thickness direction retardation Rth" refers to a thickness direction retardation value measured at 23° C. by using light of a wavelength of 590 nm. Rth can be determined from an equation Rth=(nx−nz)×d, where nx and nz represent refractive indices of a film (layer) at a wavelength of 590 nm in a slow axis direction and a thickness direction, respectively, and d (nm) represents a thickness of the film (layer).

(4) The subscript "1" attached to a term or symbol described in the specification of the present invention represents a first optical compensation layer. The subscript "2" attached to a term or symbol described in the specification of the present invention represents a second optical compensation layer. The subscript "3" attached to a term or symbol described in the specification of the present invention represents a third optical compensation layer.

(5) The term "λ/2 plate" refers to a plate having a function of converting linearly polarized light having a specific vibration direction into linearly polarized light having a vibration direction perpendicular thereto, or converting right-handed circularly polarized light into left-handed circularly polarized light (or converting left-handed circularly polarized light into right-handed circularly polarized light). The λ/2 plate has an in-plane retardation value of a film (layer) of about ½ of a predetermined light wavelength (generally, visible light region).

(6) The term "λ/4 plate" refers to a plate having a function of converting linearly polarized light of a specific wavelength into circularly polarized light (or converting circularly polarized light into linearly polarized light). The λ/4 plate has an in-plane retardation value of a film (layer) of about ¼ of a predetermined light wavelength (generally, visible light region).

(7) The term "cholesteric alignment fixed layer" refers to a layer in which: molecules forming the layer form a helical structure; a helical axis of the helical structure is aligned substantially perpendicular to a plane direction; and an alignment state is fixed. Thus, the term "cholesteric alignment fixed layer" not only refers to the case where liquid crystal compound exhibits a cholesteric liquid crystal phase, but also includes the case where a non-liquid crystal compound has a pseudo structure of a cholesteric liquid crystal phase. For example, the "cholesteric alignment fixed layer" may be formed by: providing torsion to a liquid crystal material exhibiting a liquid crystal phase with a chiral agent for alignment into a cholesteric structure (helical structure); subjecting the liquid crystal material to polymerization treatment or crosslinking treatment for fixing the alignment (cholesteric structure) of the liquid crystal material.

(8) The phrase "selective reflection wavelength region of 350 nm or less" indicates that a center wavelength λ of a selective reflection wavelength region is 350 nm or less. For example, in the case where the cholesteric alignment fixed layer is formed by using a liquid crystal monomer, the center wavelength λ of the selective reflection wavelength region may be represented by the following equation.

$$\lambda = n \times P$$

In the equation, n represents an average refractive index of the liquid crystal monomer, and P represents a helical pitch (nm) of the cholesteric alignment fixed layer. The average refractive index n is represented by $(n_o+n_e)/2$, and is generally within a range of 1.45 to 1.65. $n_o$ represents an ordinary refractive index of the liquid crystal monomer, and $n_e$ represents an extraordinary refractive index of the liquid crystal monomer.

(9) The term "chiral agent" refers to a compound having a function of aligning the liquid crystal material (nematic liquid crystals, for example) into a cholesteric structure.

(10) The term "torsional force" refers to ability of the chiral agent to provide torsion to the liquid crystal material and to align the liquid crystal material into a cholesteric structure (helical structure). In general, the torsional force may be represented by the following equation.

$$\text{Torsional force} = 1/(P \times W)$$

As described above, P represents a helical pitch (nm) of the cholesteric alignment fixed layer. W represents a weight ratio of the chiral agent. The weight ratio W of the chiral agent may be represented by W=[X/(X+Y)]×100. X represents a weight of the chiral agent, and Y represents a weight of the liquid crystal material.

A. Polarizing Plate Provided with Optical Compensation Layer

Figure 2:
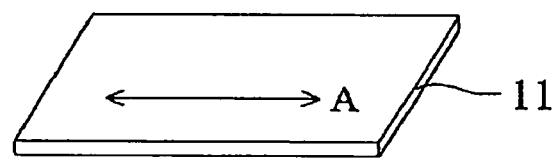
FIG. 2 An exploded perspective view of a polarizing plate provided with optical compensation layers according to a preferred embodiment of the present invention.
Figure 2:
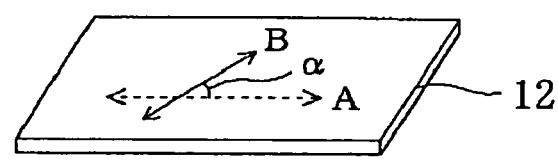
Figure 2:
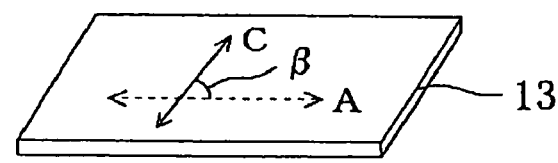
Figure 2:
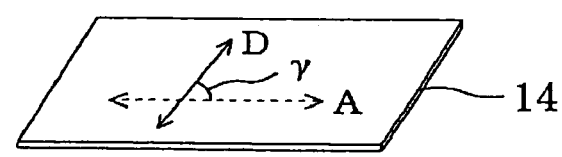

A-1. Overall Structure of Polarizing Plate Provided with Optical Compensation Layer FIG. 1 is a schematic sectional view of a polarizing plate provided with optical compensation layers according to a preferred embodiment of the present invention. FIG. 2 is an exploded perspective view explaining optical axes of respective layers constituting the polarizing plate provided with optical compensation layers. As shown in FIG. 1, a polarizing plate provided with optical compensation layers 10 includes a polarizer 11, a first optical compensation layer 12, a second optical compensation layer 13, and a third optical compensation layer 14 in the stated order. The layers of the polarizing plate provided with optical compensation layers are laminated through any appropriate pressure-sensitive adhesive layer or adhesive (not shown). For practical use, any appropriate protective film (not shown) may be laminated on the polarizer 11 on a side having no optical compensation layer formed. Further, as required, a protective film may be provided between the polarizer 11 and the first optical compensation layer 12.

The first optical compensation layer 12 contains a resin having an absolute value of photoelastic coefficient of $2\times10^{-11}$ $m^2/N$ or less, and has a relationship of nx>ny=nz and an in-plane retardation $Re_1$ of 200 to 300 nm. The second optical compensation layer 13 contains a resin having an absolute value of photoelastic coefficient of $2\times10^{-11}$ $m^2/N$ or less, and has a relationship of nx>ny=nz and an in-plane retardation $Re_2$ of 90 to 160 nm. The third optical compensation layer 14 has a relationship of nx=ny>nz, an in-plane retardation $Re_3$ of 0 to 20 nm, and a thickness direction retardation $Rth_3$ of 30 to 300 nm. Details of the first optical compensation layer, second optical compensation layer, and third optical compensation layer are described below in the sections A-2, A-3, and A-4, respectively.

In the present invention, as shown in FIG. 2, the first optical compensation layer 12 is laminated such that its slow axis B forms a predetermined angle α with an absorption axis A of the polarizer 11. The angle α is 10° to 30°, preferably 12° to 27°, and more preferably 14° to 25° in a counterclockwise direction with respect to the absorption axis A of the polarizer 11. The second optical compensation layer 13 is laminated such that its slow axis C forms a predetermined angle β with the absorption axis A of the polarizer 11. The angle β is 70° to 95°, preferably 72° to 93°, and more preferably 74° to 92° in a counterclockwise direction with respect to the absorption axis A of the polarizer 11. The third optical compensation layer 14 is laminated such that its slow axis D forms a predetermined angle γ with the absorption axis A of the polarizer 11. The angle γ is 70° to 95°, preferably 72° to 93°, and more preferably 74° to 92° in a counterclockwise direction with respect to the absorption axis A of the polarizer 11. Three specific optical compensation layers may be laminated in such a specific positional relationship, to thereby significantly prevent light leak in black display of a liquid crystal display apparatus of VA mode (reflective or semi-transmissive VA mode, in particular).

A total thickness of the polarizing plate provided with optical compensation layers of the present invention is preferably 80 to 270 µm, more preferably 110 to 270 µm, and most preferably 140 to 270 µm. According to the present invention, the third optical compensation layer (negative C plate: described below) is formed of a composition containing a liquid crystal monomer and a chiral agent, to thereby significantly increase a difference between nx and nz (nx>>nz). As a result, the third optical compensation layer may have a very small thickness. For example, a conventional negative C plate produced through biaxial stretching has a thickness of 60 µm or more, but the third optical compensation layer to be used in the present invention may have a thickness down to 2 µm. As a result, the polarizing plate provided with optical compensation layers of the present invention may have a very small total thickness compared with that of a conventional polarizing plate provided with optical compensation layers having a similar structure (that is, a four-layer structure). As a result, the polarizing plate provided with optical compensation layers of the present invention may greatly contribute to reduction in thickness of an image display apparatus.

A-2. First Optical Compensation Layer

The first optical compensation layer 12 may serve as a λ/2 plate. The first optical compensation layer serves as a λ/2 plate, to thereby appropriately adjust retardation of wavelength dispersion properties (in particular, a wavelength range where the retardation departs from λ/4) of the second optical compensation layer serving as a λ/4 plate. Such a first optical compensation layer has an in-plane retardation $Re_1$ of 200 to 300 nm, preferably 220 to 280 nm, and more preferably 230 to 270 nm. The first optical compensation layer 12 has a refractive index profile of nx>ny=nz.

A thickness of the first optical compensation layer may be set such that it serves as a λ/2 plate most appropriately. That is, the thickness thereof is set to provide a desired in-plane retardation. To be specific, the thickness of the first optical compensation layer is preferably 37 to 53 µm, more preferably 40 to 50 µm, and most preferably 43 to 47 µm.

The first optical compensation layer 12 contains a resin having an absolute value of photoelastic coefficient of $2\times10^{-11}$ $m^2/N$ or less, preferably $2.0\times10^{-13}$ to $1.0\times10^{-11}$ $m^2/N$, and more preferably $1.0\times10^{-12}$ to $1.0\times10^{-11}$ $m^2/N$. An absolute value of photoelastic coefficient within the above ranges hardly causes change in retardation due to shrinkage stress under heating. Thus, the first optical compensation layer may be formed by using a resin having such an absolute value of photoelastic coefficient, to thereby favorably prevent uneven display due to heat of an image display apparatus to be obtained.

Typical examples of the resin capable of satisfying such a photoelastic coefficient include a cyclic olefin-based resin and a cellulose-based resin. The cyclic olefin-based resin is particularly preferred. The cyclic olefin-based resin is a general term for a resin prepared through polymerization of a cyclic olefin as a monomer, and examples thereof include resins described in JP 1-240517 A, JP 3-14882 A, JP 3-122137 A, and the like. Specific examples thereof include: a ring opened (co)polymer of a cyclic olefin; an addition polymer of a cyclic olefin; a copolymer (typically, a random copolymer) of a cyclic olefin, and an α-olefin such as ethylene or propylene; their graft modified products each modified with an unsaturated carboxylic acid or its derivative; and hydrides thereof. A specific example of the cyclic olefin includes a norbornene-based monomer.

Examples of the norbornene-based monomer include: norbornene, its alkyl substitution and/or alkylidene substitution such as 5-methyl-2-norbornene, 5-dimethyl-2-norbornene, 5-ethyl-2-norbornene, 5-butyl-2-norbornene, 5-ethylidene-2-norbornene, and their products each substituted by a polar group such as halogen; dicyclopentadiene and 2,3-dihydrodicyclopentadiene; dimethano octahydronaphtalene, its alkyl substitution and/or alkylidene substitution, and their products each substituted by a polar group such as halogen, for example, 6-methyl-1,4:5,8-dimethano-1,4,4a,5,6,7,8,8a-octahydronaphtalene, 6-ethyl-1,4:5,8-dimethano-1,4,4a,5,6,7,8,8a-octahydronaphtalene, 6-ethylidene-1,4:5,8-dimethano-1,4,4a,5,6,7,8,8a-octahydronaphtalene, 6-chloro-1,4:5,8-dimethano-1,4,4a,5,6,7,8,8a-octahydronaphtalene, 6-cyano-1,4:5,8-dimethano-1,4,4a,5,6,7,8,8a-octahydronaphtalene, 6-pyridyl-1,4:5,8-dimethano-1,4,4a,5,6,7,8,8a-octahydronaphtalene, and 6-methoxycarbonyl-1,4:5,8-dimethano-1,4,4a,5,6,7,8,8a-octahydronaphtalene; and a trimer of cyclopentadiene and a tetramer of cyclopentadiene, for example, 4,9:5,8-dimethano-3a,4,4a,5,8,8a,9,9a-octahydro-1H-benzoindene and 4,11:5,10:6,9-trimethano-3a,4,4a,5,5a,6,9,9a,10,10a,11,11a-dodecahydro-1H-cyclopentaanthracene.

In the present invention, other ring-opening polymerizable cycloolefins can be combined without impairing the purpose of the present invention. Specific example of such cycloolefin includes a compound having one reactive double-bond, for example, cyclopentene, cyclooctene, and 5,6-dihydrodicyclopentadiene.

The cyclic olefin-based resin has a number average molecular weight (Mn) of preferably 25,000 to 200,000, more preferably 30,000 to 100,000, and most preferably 40,000 to 80,000 measured through a gel permeation chromatography (GPC) method by using a toluene solvent. A number average molecular weight within the above ranges can provide a resin having excellent mechanical strength, and favorable solubility, forming property, and casting operability.

In the case where the cyclic olefin-based resin is prepared through hydrogenation of a ring opened polymer of a norbornene-based monomer, a hydrogenation rate is preferably 90% or more, more preferably 95% or more, and most preferably 99% or more. A hydrogenation rate within the above ranges can provide excellent heat degradation resistance, light degradation resistance, and the like.

For the cyclic olefin-based resin, various products are commercially available. Specific examples of the resin include the trade names "ZEONEX" and "ZEONOR" each manufactured by ZEON CORPORATION, the trade name "Arton" manufactured by JSR Corporation, the trade name "TOPAS" manufactured by TICONA Corporation, and the trade name "APEL" manufactured by Mitsui Chemicals, Inc.

Any appropriate cellulose-based resin (typically an ester of cellulose and acid) may be employed as the cellulose-based resin. An ester of cellulose and fatty acid is preferred. Specific examples of such cellulose-based resin include cellulose triacetate (triacetylcellulose: TAC), cellulose diacetate, cellulose tripropionate, and cellulose dipropionate. Cellulose triacetate (triacetyl cellulose: TAC) is particularly preferred because it has low birefringence and high transmittance. In addition, many products of TAC are commercially available, and thus TAC has advantages of availability and cost.

Specific examples of commercially available products of TAC include the trade names "UV-50", "UV-80", "SH-50", "SH-80", "TD-80U", "TD-TAC", and "UZ-TAC" each manufactured by Fuji Photo Film CO., LTD., the trade name "KC series" manufactured by Konica Minolta Corporation, and the trade name "Triacetyl Cellulose 80 µm series" manufactured by Lonza Japan Corporation. Of those, "TD-80U" is preferred because of excellent transmittance and durability. In particular, "TD-80U" has excellent adaptability to a TFT-type liquid crystal display apparatus.

The first optical compensation layer 12 is preferably obtained by stretching a film formed of the cyclic olefin-based resin or the cellulose-based resin. Any appropriate forming method may be employed as a method of forming a film from the cyclic olefin-based resin or the cellulose-based resin. Specific examples thereof include a compression molding method, a transfer molding method, an injection molding method, an extrusion molding method, a blow molding method, a powder molding method, an FRP molding method, and a casting method. The extrusion molding method and the casting method are preferred because a film to be obtained may have enhanced smoothness and favorable optical uniformity. Forming conditions may appropriately be set in accordance with the composition or type of resin to be used, properties desired for the first optical compensation layer, and the like. Many film products of the cyclic olefin-based resin and the cellulose-based resin are commercially available, and the commercially available films may be subjected to the stretching treatment.

A stretch ratio of the film may vary depending on the in-plane retardation value and thickness desired for the first optical compensation layer, the type of resin to be used, the thickness of the film to be used, the stretching temperature, and the like. To be specific, the stretch ratio is preferably 1.75 to 2.05 times, more preferably 1.80 to 2.00 times, and most preferably 1.85 to 1.95 times. Stretching at such a stretch ratio may provide a first optical compensation layer having an in-plane retardation which may appropriately exhibit the effect of the present invention.

A stretching temperature of the film may vary depending on the in-plane retardation value and thickness desired for the first optical compensation layer, the type of resin to be used, the thickness of the film to be used, the stretch ratio, and the like. To be specific, the stretching temperature is preferably 130 to 150° C., more preferably 135 to 145° C., and most preferably 137 to 143° C. Stretching at such a stretching temperature may provide a first optical compensation layer having an in-plane retardation which may appropriately exhibit the effect of the present invention.

Referring to FIG. 1, the first optical compensation layer 12 is arranged between the polarizer 11 and the second optical compensation layer 13. Any appropriate method may be employed as a method of arranging the first optical compensation layer in accordance with the purpose. Typically, the first optical compensation layer 12 is provided with a pressure-sensitive adhesive layer (not shown) on each side, and the first optical compensation layer 12 is bonded to the polarizer 11 and the second optical compensation layer 13. A gap between the layers is filled with the pressure-sensitive adhesive layer as described above, to thereby prevent shift in relationship among optical axes of the respective layers and abrasion among the layers causing damages when the first optical compensation layer is incorporated into an image display apparatus. Furthermore, reflection at the interface between the respective layers may be reduced, to thereby provide an image display apparatus having high contrast.

The thickness of the pressure-sensitive adhesive layer may appropriately be set in accordance with the intended use, adhesive strength, and the like. To be specific, the pressure-sensitive adhesive layer has a thickness of preferably 1 µm to 100 µm, more preferably 5 µm to 50 µm, and most preferably 10 µm to 30 µm.

Any appropriate pressure-sensitive adhesive may be employed as a pressure-sensitive adhesive forming the pressure-sensitive adhesive layer. Specific examples thereof include a solvent-type pressure-sensitive adhesive, a non-aqueous emulsion-type pressure-sensitive adhesive, an aqueous pressure-sensitive adhesive, and a hot-melt pressure-sensitive adhesive. A solvent-type pressure-sensitive adhesive containing an acrylic polymer as a base polymer is preferably used for exhibiting appropriate pressure-sensitive adhesive properties (wettability, cohesiveness, and adhesiveness) with respect to the polarizer and the first optical compensation layer and providing excellent optical transparency, weatherability, and heat resistance.

A-3. Second Optical Compensation Layer

The second optical compensation layer 13 may serve as a $\lambda/4$ plate. According to the present invention, wavelength dispersion properties of the second optical compensation layer serving as a $\lambda/4$ plate may be corrected with optical properties of the first optical compensation layer serving as a $\lambda/2$ plate, to thereby exhibit a function of circularly polarized light in a broad wavelength range. Such a second optical compensation layer has an in-plane retardation $Re_2$ of 90 to 160 nm, preferably 100 to 150 nm, and more preferably 110 to 140 nm. The second optical compensation layer 13 has a refractive index profile of nx>ny=nz.

A thickness of the second optical compensation layer may be set such that it serves as a $\lambda/4$ plate most appropriately. That is, the thickness thereof is set to provide a desired in-plane retardation. To be specific, the thickness of the second optical compensation layer is preferably 42 to 58 µm, more preferably 45 to 55 µm, and most preferably 48 to 52 µm.

The second optical compensation layer 13 contains a resin having an absolute value of photoelastic coefficient of $2 \times 10^{-11}$ $m^2/N$ or less, preferably $2.0 \times 10^{-13}$ to $1.0 \times 10^{-11}$ $m^2/N$, and more preferably $1.0 \times 10^{-12}$ to $1.0 \times 10^{-11}$ $m^2/N$. An absolute value of photoelastic coefficient within the above ranges hardly causes change in retardation due to shrinkage stress under heating. Thus, the second optical compensation layer may be formed by using a resin having such an absolute value of photoelastic coefficient, to thereby favorably prevent uneven display due to heat of an image display apparatus to be obtained, in cooperation with the effect of the first optical compensation layer.

Typical examples of the resin capable of satisfying such a photoelastic coefficient include a cyclic olefin-based resin and a cellulose-based resin. Details of the cyclic olefin-based resin and the cellulose-based resin are as described in the above section A-2.

The in-plane retardation $Re_2$ of the second optical compensation layer 13 may preferably be controlled by changing the stretch ratio and stretching temperature of the cyclic olefin-based resin film or the cellulose-based resin film described in the above section A-2. The stretch ratio may vary depending on the in-plane retardation value and thickness desired for the second optical compensation layer, the type of resin to be used, the thickness of the film to be used, the stretching temperature, and the like. To be specific, the stretch ratio is preferably 1.17 to 1.47 times, more preferably 1.22 to 1.42 times, and most preferably 1.27 to 1.37 times. Stretching at such a stretch ratio may provide a second optical compensation layer having an in-plane retardation which may appropriately exhibit the effect of the present invention.

A stretching temperature may vary depending on the in-plane retardation value and thickness desired for the second optical compensation layer, the type of resin to be used, the thickness of the film to be used, the stretch ratio, and the like. To be specific, the stretching temperature is preferably 130 to 150° C., more preferably 135 to 145° C., and most preferably 137 to 143° C. Stretching at such a stretching temperature may provide a second optical compensation layer having an in-plane retardation which may appropriately exhibit the effect of the present invention.

Referring to. FIG. 1, the second optical compensation layer 13 is arranged between the first optical compensation layer 12 and the third optical compensation layer 14. Any appropriate method may be employed as a method of arranging the second optical compensation layer in accordance with the purpose. Typically, the second optical compensation layer 13 is provided with a pressure-sensitive adhesive layer (not shown) on its first optical compensation layer 12 side, and the first optical compensation layer 12 is attached thereto. Furthermore, the second optical compensation layer 13 is provided with an adhesive layer (not shown) on its third optical compensation layer 14 side, and the third optical compensation layer 14 is attached thereto. In the case where the third optical compensation layer 14 has a laminate structure (cholesteric alignment fixed layer/plastic film layer), the second optical compensation layer 13 and the plastic film layer are attached together through a pressure-sensitive adhesive layer, and the cholesteric alignment fixed layer and the plastic film layer are attached together through an adhesive layer. Details of the pressure-sensitive adhesive layer are as described in the above section A-2.

A typical example of an adhesive used for forming the adhesive layer includes a curable adhesive. Typical examples of the curable adhesive include: a photo-curable adhesive such as a UV-curable adhesive; a moisture-curable adhesive; and a heat-curable adhesive. A specific example of the heat-curable adhesive includes a thermosetting resin-based adhesive formed of an epoxy resin, an isocyanate resin, a polyimide resin, or the like. A specific example of the moisture-curable adhesive includes an isocyanate resin-based moisture-curable adhesive. The moisture-curable adhesive (in particular, an isocyanate resin-based moisture-curable adhesive) is preferred. The moisture-curable adhesive cures through a reaction with moisture in air, water adsorbed on a surface of an adherend, an active hydrogen group of a hydroxyl group or a carboxyl group or the like, etc. Thus, the adhesive may be applied and then cured naturally by leaving at stand, and has excellent operability. Further, the moisture-curable adhesive requires no heating for curing, and thus the third optical compensation layer is not heated during lamination (bonding). As a result, no heat shrinkage occurs, and thus formation of cracks during lamination or the like may significantly be prevented even in the case where the third optical compensation layer has a very small thickness as in the present invention. In addition, the curable adhesive hardly stretches or shrinks under heating after curing. Thus, formation of cracks during lamination or the like may significantly be prevented even in the case where the third optical compensation layer has a very small thickness or where a polarizing plate to be obtained is used under high temperature conditions. Note that the isocyanate resin-based adhesive is a general term for a polyisocyanate-based adhesive and a polyurethane resin adhesive.

For example, a commercially available adhesive may be used as the curable adhesive, or various curable resins may be dissolved or dispersed in a solvent to prepare a curable resin adhesive solution (or dispersion). In the case where the solution (or dispersion) is prepared, a ratio of the curable resin in the solution is preferably 10 to 80 wt %, more preferably 20 to 65%, especially preferably 25 to 65 wt %, and most preferably 30 to 50 wt % in solid content. Any appropriate solvent may be used as the solvent in accordance with the type of curable resin, and specific examples thereof include ethyl acetate, methyl ethyl ketone, methyl isobutyl ketone, toluene, and xylene. Such solvent may be used alone or in combination.

An application amount of the adhesive to the second optical compensation layer may appropriately be set in accordance with the purpose. For example, the application amount is preferably 0.3 to 3 ml, more preferably 0.5 to 2 ml, and most preferably 1 to 2 ml per area (cm²) of the second optical compensation layer. After the application, the solvent in the adhesive is evaporated through natural drying or heat drying as required. A thickness of the adhesive layer to be obtained is preferably 0.1 to 20 μm, more preferably 0.5 to 15 μm, and most preferably 1 to 10 μm. A Microhardness of the adhesive layer is preferably 0.1 to 0.5 GPa, more preferably 0.2 to 0.5 GPa, and most preferably 0.3 to 0.4 GPa. Correlation between Microhardness and Vickers hardness is known, and thus the Microhardness may be converted into Vickers hardness. The Microhardness may be calculated from indentation depth and indentation load by using a thin-film hardness meter (trade names, MH4000 and MHA-400, for example) manufactured by NEC Corporation.

A-4. Third Optical Compensation Layer

A-4-1. Overall Structure of Third Optical Compensation Layer

The third optical compensation layer 14 has a relationship of nx=ny>nz and may serve as a so-called negative C plate. The third optical compensation layer has such a refractive index profile, to thereby allow favorable birefringence compensation of a liquid crystal layer of a liquid crystal cell of VA mode. As a result, a liquid crystal display apparatus having significantly improved viewing angle properties can be obtained. As described above, the expression "nx=ny" not only refers to the case where nx and ny are exactly equal but also includes the case where nx and ny are substantially equal. Thus, the third optical compensation layer may have an in-plane retardation and may have a slow axis. The third optical compensation layer which may serve as a negative C plate in practical use has an in-plane retardation $Re_3$ of 0 to 20 nm, preferably 0 to 10 nm, and more preferably 0 to 5 nm.

The third optical compensation layer 14 has a thickness direction retardation $Rth_3$ of 30 to 300 nm, preferably 60 to 180 nm, more preferably 80 to 150 nm, and most preferably 100 to 120 nm. The thickness of the third optical compensation layer for providing such a thickness direction retardation may vary depending on a material to be used and the like. For example, the third optical compensation layer has a thickness of preferably 1 to 50 μm, more preferably 1 to 20 μm, and most preferably 1 to 15 μm. In the case where the third optical compensation layer is formed of a cholesteric alignment fixed layer described below alone, the third optical compensation layer has a thickness of preferably 1 to 10 μm, more preferably 1 to 8 μm, and most preferably 1 to 5 μm. Such a thickness is smaller than the thickness (60 μm or more, for example) of the negative C plate obtained through biaxial stretching, and may greatly contribute to reduction in thickness of an image display apparatus. Further, the third optical compensation layer may be formed to have a very small thickness, to thereby significantly prevent uneven display due to heat. Such an optical compensation layer having a very small thickness is preferred from the viewpoints of preventing disturbance in cholesteric alignment or reduction in transmittance, selective reflection property, color protection, productivity, and the like. The third optical compensation layer (negative C plate) of the present invention may be formed from any appropriate material as long as the above-mentioned thickness and optical properties can be obtained. Preferably, a negative C plate having such a very small thickness is realized by forming cholesteric alignment by using a liquid crystal material and fixing the cholesteric alignment, that is, by using a cholesteric alignment fixed layer (details of a material used for forming the cholesteric alignment and a method of fixing the cholesteric alignment are described below).

Preferably, the third optical compensation layer 14 is formed of a cholesteric alignment fixed layer having a selective reflection wavelength region of 350 nm or less. An upper limit of the selective reflection wavelength region is more preferably 320 nm or less, and most preferably 300 nm or less. Meanwhile, a lower limit of the selective reflection wavelength region is preferably 100 nm or more, and more preferably 150 nm or more. In the case where the selective reflection wavelength region is more than 350 nm, the selective reflection wavelength region covers a visible light region and thus may cause a problem such as coloring or decoloring. In the case where the selective reflection wavelength region is less than 100 nm, amount of a chiral agent (described below) to be used increases excessively and thus a temperature during formation of an optical compensation layer must be controlled very accurately. As a result, a polarizing plate may hardly be produced.

A helical pitch in the cholesteric alignment fixed layer is preferably 0.01 to 0.25 μm, more preferably 0.03 to 0.20 μm, and most preferably 0.05 to 0.15 μm. A helical pitch of 0.01 μm or more provides sufficient alignment property, for example. A helical pitch of 0.25 μm or less allows sufficient suppression of rotary polarization in a shorter wavelength side of visible light, to thereby sufficiently prevent light leak and the like. The helical pitch maybe controlled by adjusting the type (torsional force) and amount of the chiral agent as described below. The helical pitch may be adjusted, to thereby control the selective reflection wavelength region within a desired range.

Alternatively, the third optical compensation layer 14 may have a laminate structure of the cholesteric alignment fixed layer and a layer (also referred to as a plastic film layer in the specification of the present invention) having a relationship of nx=ny>nz and containing a resin having an absolute value of photoelastic coefficient of $2 \times 10^{-11}$ m²/N or less. Typical examples of a material capable of forming the plastic film layer (resin capable of satisfying such a photoelastic coefficient) include a cyclic olefin-based resin and a cellulose-based resin. Details of the cyclic olefin-based resin and the cellulose-based resin are as described in the above section A-2. A cellulose-based resin film (typically, a TAC film) is a film having a relationship of nx=ny>nz.

A-4-2. Liquid Crystal Composition Forming Third Optical Compensation Layer (Cholesteric Alignment Fixed Layer): Liquid Crystal Material The third optical compensation layer (cholesteric alignment fixed layer) may be formed of a liquid crystal composition. Any appropriate liquid crystal material may be used as a liquid crystal material to be included in the composition. The liquid crystal material (nematic liquid crystals) preferably has a liquid crystal phase of a nematic phase. Examples of such a liquid crystal material that may be used include a liquid crystal polymer and a liquid crystal monomer. The liquid crystal material may exhibit liquid crystallinity through a lyotropic or thermotropic mechanism. Further, liquid crystals are preferably aligned in homogeneous alignment. A content of the liquid crystal material in the liquid crystal composition is preferably 75 to 95 wt %, and more preferably 80 to 90 wt %. In the case where the content of the liquid crystal material is less than 75 wt %, the composition may not sufficiently exhibit a liquid crystal state and thus the cholesteric alignment may not be formed sufficiently. In the case where the content of the liquid crystal material is more than 95 wt %, a content of a chiral agent may be reduced to prevent sufficient torsion to be provided and thus the cholesteric alignment may not be formed sufficiently.

The liquid crystal material is preferably a liquid crystal monomer (polymerizable monomer or cross linking monomer, for example) because an alignment state of the liquid crystal monomer can be fixed by polymerizing or crosslinking the liquid crystal monomer as described below. The alignment state may be fixed by aligning the liquid crystal monomer and then, for example, polymerizing or crosslinking the liquid crystal monomers with each other. As a result, a polymer is formed through polymerization and a three-dimensional network structure is formed through crosslinking. The polymer and the three-dimensional network structure are non-liquid crystalline. Thus, the thus-formed third optical compensation layer does not transfer into, for example, a liquid crystal phase, glass phase, or crystal phase due to temperature change unique to a liquid crystal compound. As a result, the third optical compensation layer realizes an optical compensation layer having very excellent stability and not affected by the temperature change.

Any suitable liquid crystal monomers may be employed as the liquid crystal monomer. For example, there are used polymerizable mesogenic compounds and the like described in JP 2002-533742 A (WO 00/37585), EP 358208 (U.S. Pat. No. 5,211,877), EP 66137 (U.S. Pat. No. 4,388,453), WO93/22397, EP 0261712, DE 19504224, DE 4408171, GB 2280445, and the like. Specific examples of the polymerizable mesogenic compounds include: LC242 (trade name) available from BASF Aktiengesellschaft; E7 (trade name) available from Merck & Co., Inc.; and LC-Silicone-CC3767 (trade name) available from Wacker-Chemie GmbH.

For example, a nematic liquid crystal monomer is preferred as the liquid crystal monomer, and a specific example thereof includes a monomer represented by the below-indicated formula (1). The liquid crystal monomer may be used alone or in combination of two or more thereof.

[Chem 1]

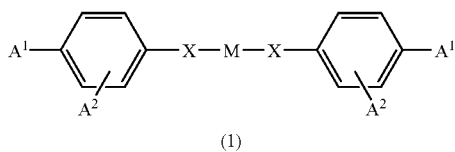

(1)

In the above formula (1), $A^1$ and $A^2$ each represent a polymerizable group, and may be the same or different from each other. One of $A^1$ and $A^2$ may represent hydrogen. Each X independently represents a single bond, —O—, —S—, —C=N—, —O—CO—, —CO—O—, —O—CO—O—, —CO—NR—, —NR—CO—, —NR—, —O—CO—NR—, —NR—CO—O—, —CH$_2$—O—, or —NR—CO—NR—. R represents H or an alkyl group having 1 to 4 carbon atoms. M represents a mesogen group.

In the above formula (1), Xs may be the same or different from each other, but are preferably the same.

Of monomers represented by the above formula (1), each $A^2$ is preferably arranged in an ortho position with respect to $A^1$.

$A^1$ and $A^2$ are preferably each independently represented by the below-indicated formula (2), and $A^1$ and $A^2$ preferably represent the same group.

Z-X-(Sp)$_n$ (2)

In the above formula (2), Z represents a crosslinkable group, and X is the same as that defined in the above formula (1). Sp represents a spacer consisting of a substituted or unsubstituted linear or branched alkyl group having 1 to 30 carbon atoms. n represents 0 or 1. A carbon chain in Sp may be interrupted by oxygen in an ether functional group, sulfur in a thioether functional group, a non-adjacent imino group, an alkylimino group having 1 to 4 carbon atoms, or the like.

In the above formula (2), Z preferably represents any one of functional groups represented by the below-indicated formulae. In the below-indicated formulae, examples of R include a methyl group, an ethyl group, an n-propyl group, an i-propyl group, an n-butyl group, an i-butyl group, and a t-butyl group.

[Chem 2]

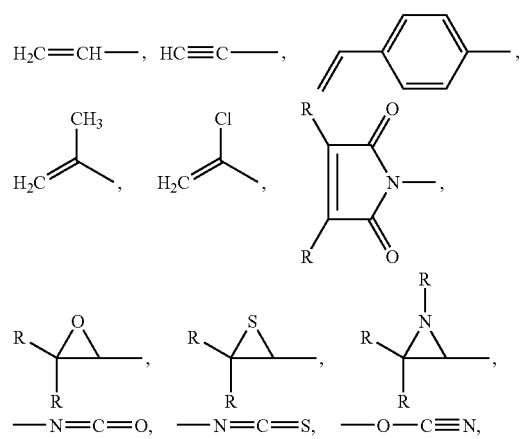

In the above formula (2), Sp preferably represents any one of structural units represented by the below-indicated formulae. In the below-indicated formulae, m preferably represents 1 to 3, and p preferably represents 1 to 12.

[Chem 3]

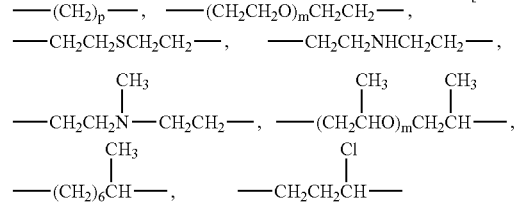

In the above formula (1), M is preferably represented by the below-indicated formula (3). In the below-indicated formula (3), X is the same as that defined in the above formula (1). Q represents a substituted or unsubstituted linear or branched alkylene group, or an aromatic hydrocarbon group, for example. Q may represent a substituted or unsubstituted linear or branched alkylene group having 1 to 12 carbon atoms, for example.

[Chem 4]

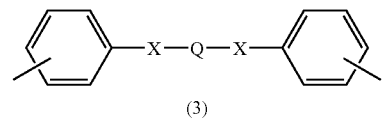

(3)

In the case where Q represents an aromatic hydrocarbon group, Q preferably represents any one of aromatic hydrocarbon groups represented by the below-indicated formulae or substituted analogues thereof.

[Chem 5]

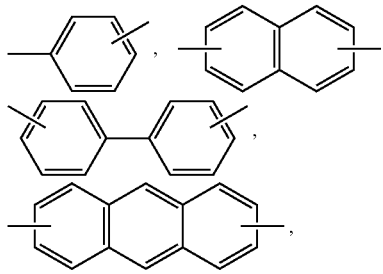
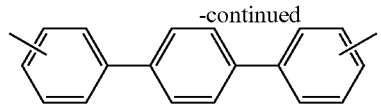

The substituted analogues of the aromatic hydrocarbon groups represented by the above formulae may each have 1 to 4 substituents per aromatic ring, or 1 to 2 substituents per aromatic ring or group. The substituents may be the same or different from each other. Examples of the substituents include: an alkyl group having 1 to 4 carbon atoms; a nitro group; a halogen group such as F, Cl, Br, or I; a phenyl group; and an alkoxy group having 1 to 4 carbon atoms.

Specific examples of the liquid crystal monomer include monomers represented by the following formulae (4) to (19).

[Chem 6]
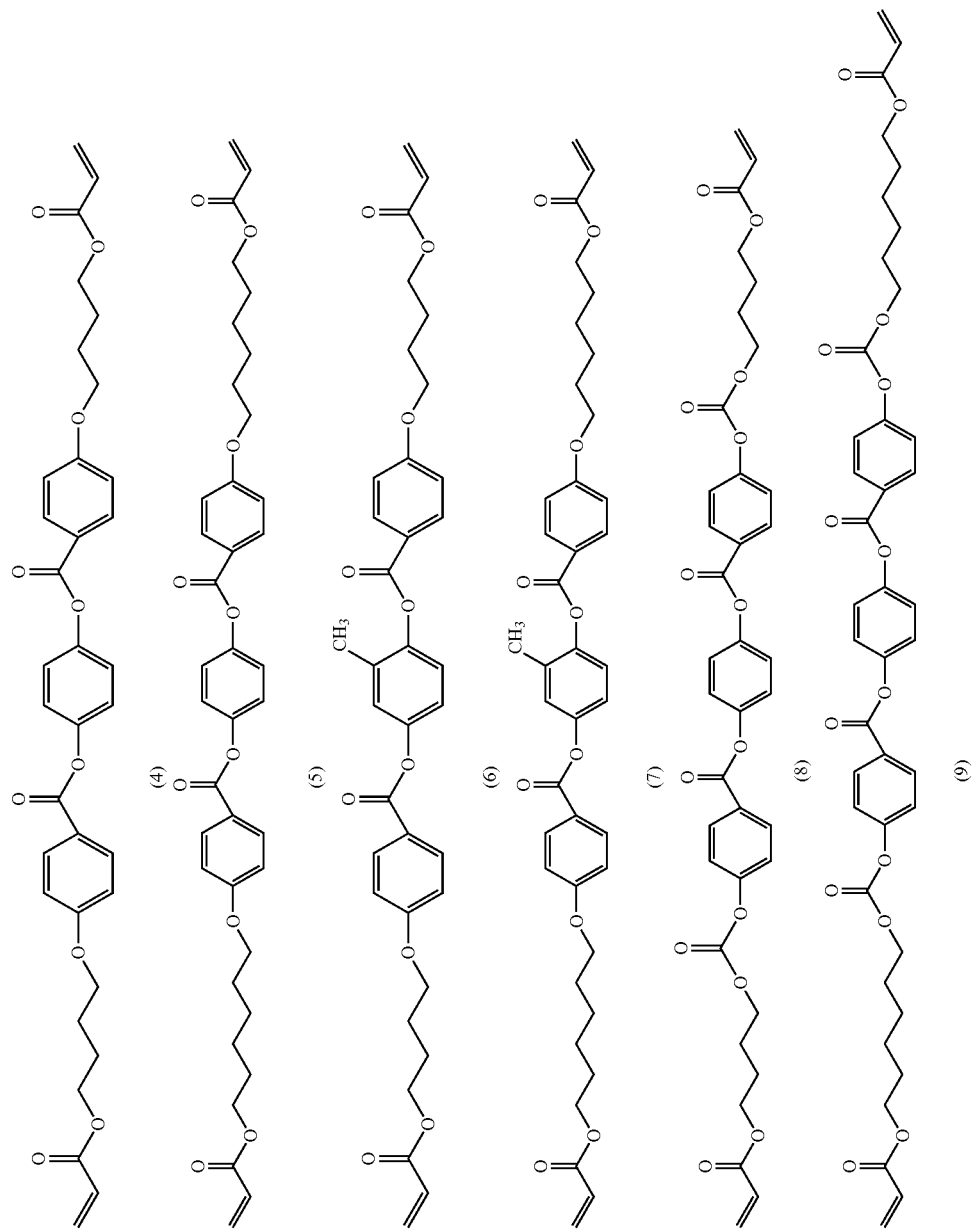

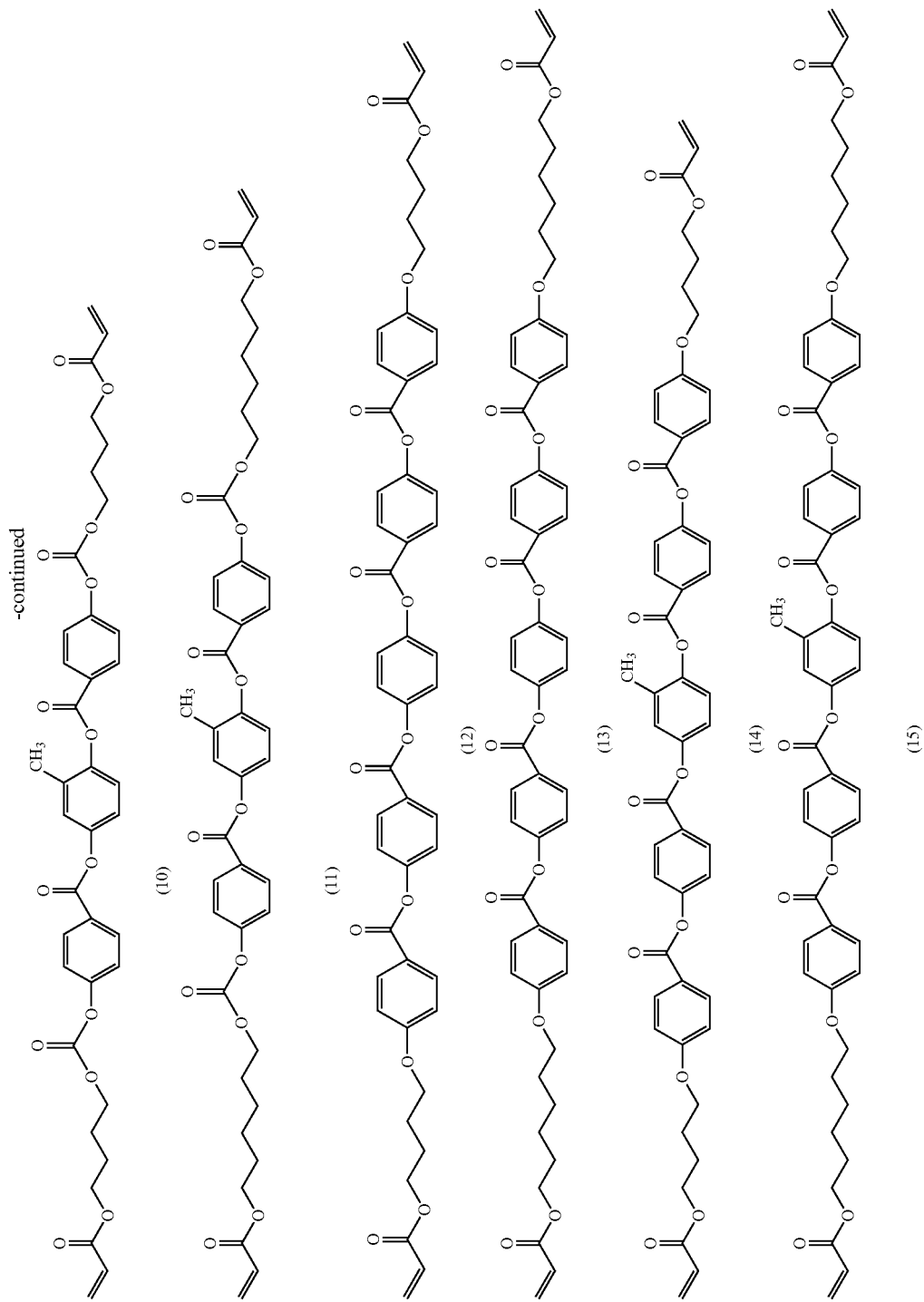

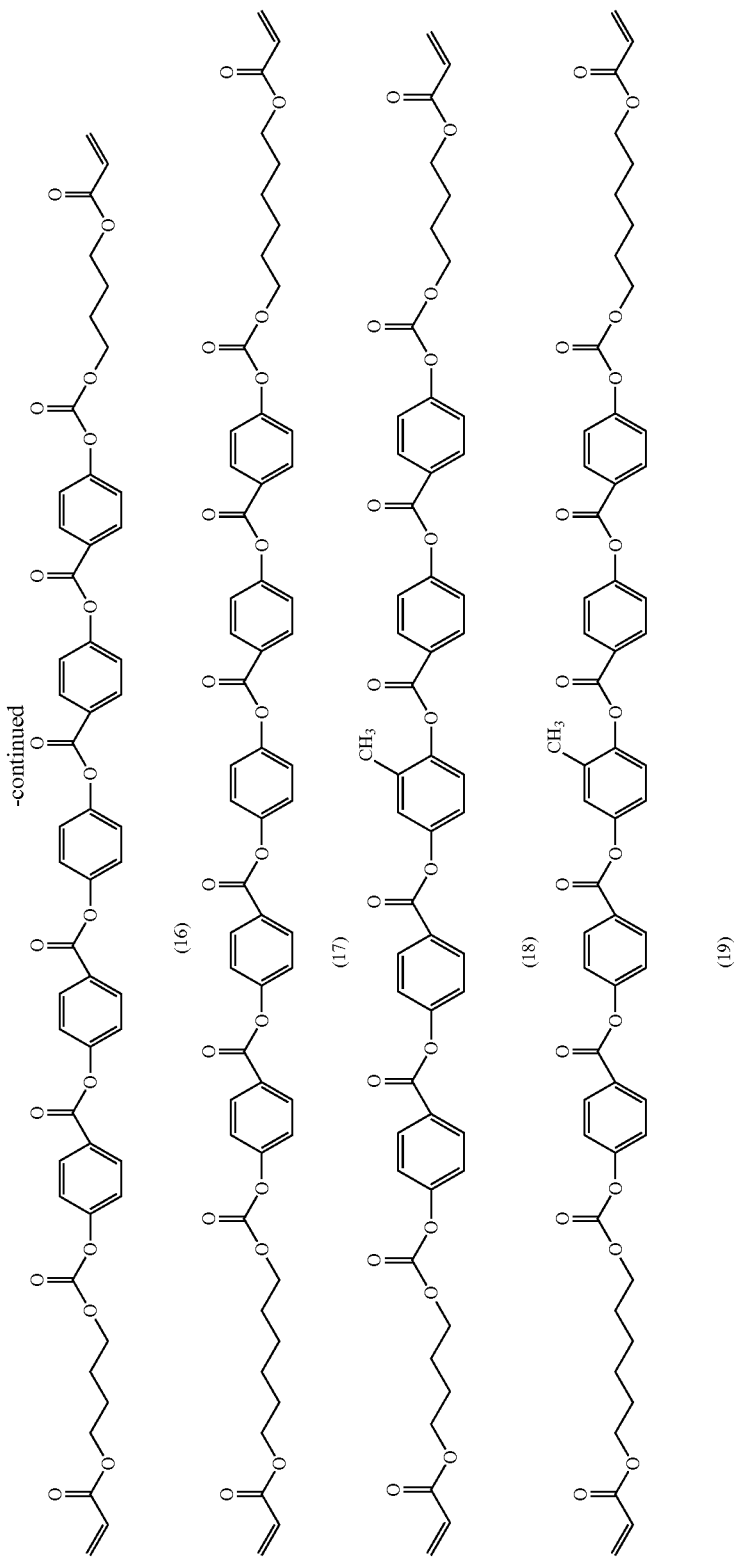

A temperature range in which the liquid crystal monomer exhibits liquid-crystallinity varies depending on the type of liquid crystal monomer. More specifically, the temperature range is preferably 40 to 120° C., more preferably 50 to 100° C., and most preferably 60 to 90° C.

A-4-3. Liquid Crystal Composition Forming Third Optical Compensation Layer (Cholesteric Alignment Fixed Layer): Chiral Agent The liquid crystal composition capable of forming the third optical compensation layer (cholesteric alignment fixed layer) preferably contains a chiral agent. A content of the chiral agent in the liquid crystal composition is preferably 5 to 23 wt %, and more preferably 10 to 20 wt %. In the case where the content of the chiral agent is less than 5 wt %, torsion cannot be sufficiently provided and thus the cholesteric alignment may not be formed sufficiently. As a result, a selective reflection wavelength region of the optical compensation layer to be obtained may be hardly controlled to a desired region (shorter wavelength side). In the case where the content of the chiral agent is more than 23 wt %, the liquid crystal material exhibits a liquid crystal state in a very narrow temperature range and a temperature during formation of an optical compensation layer must be controlled very accurately. As a result, production of a polarizing plate may involve difficulties. Such chiral agent may be used alone or in combination.

The chiral agent may employ any appropriate material capable of aligning the liquid crystal material into a desired cholesteric structure. For example, such a chiral agent has a torsional force of preferably $1 \times 10^{-6}$ nm$^{-1}$·(wt %)$^{-1}$ or more, more preferably $1 \times 10^{-5}$ nm$^{-1}$·(wt %)$^{-1}$ to $1 \times 10^{-2}$ nm$^{-1}$·(wt %)$^{-1}$, and most preferably $1 \times 10^{-4}$ nm$^{-1}$·(wt %)$^{-1}$ to $1 \times 10^{-3}$ nm$^{-1}$·(wt %)$^{-1}$. A chiral agent having such a torsional force may be used, to thereby control a helical pitch of the cholesteric alignment fixed layer within a desired range and control the selective reflection wavelength region within a desired range. For example, in the case where chiral agents of equal torsional force are used, a larger content of the chiral agent in the liquid crystal composition provides an optical compensation layer having a selective reflection wavelength region on a shorter wavelength side. For example, in the case where the content of the chiral agent in the liquid crystal composition is equal, a chiral agent having a larger torsional force provides an optical compensation layer having a selective reflection wavelength region on a shorter wavelength side. A specific example thereof is described below. For setting the selective reflection wavelength region of the optical compensation layer to be formed within a range of 200 to 220 nm, a liquid crystal composition may contain 11 to 13 wt % of a chiral agent having a torsional force of $5 \times 10^{-4}$ nm$^{-1}$·(wt %)$^{-1}$, for example. For setting the selective reflection wavelength region of the optical compensation layer to be formed within a range of 290 to 310 nm, a liquid crystal composition may contain 7 to 9 wt % of a chiral agent having a torsional force of $5 \times 10^{-4}$ nm$^{-1}$·(wt %)$^{-1}$, for example.

The chiral agent is preferably a polymerizable chiral agent. Specific examples of the polymerizable chiral agent include chiral compounds represented by the following general formulae (20) to (23).

$$(Z-X^5)_n Ch \quad (20)$$

$$(Z-X^2-Sp-X^5)_n Ch \quad (21)$$

$$(P^1-X^5)_n Ch \quad (22)$$

$$(Z-X^2-Sp-X^3-M-X^4)_n Ch \quad (23)$$

In the formulae (20) to (23), Z and Sp are the same as those defined for the above formula (2). $X^2$, $X^3$, and $X^4$ each independently represent a chemical single bond, —O—, —S—, —O—CO—, —CO—O—, —O—CO—O—, —CO—NR—, —NR—CO—, —O—CO—NR—, —NR—CO—O—, or —NR—CO—NR—. R represents H or an alkyl group having 1 to 4 carbon atoms. $X^5$ represents a chemical single bond, —O—, —S—, —O—CO—, —CO—O—, —O—CO—O—, —CO—NR—, —NR—CO—, —O—CO—NR—, —NR—CO—O—, —NR—CO—NR—, —CH$_2$O—, —O—CH$_2$—, —CH=N—, —N=CH—, or —N=N—. R represents H or an alkyl group having 1 to 4 carbon atoms as described above. M represents a mesogenic group as described above. $P^1$ represents hydrogen, an alkyl group having 1 to 30 carbon atoms, an acyl group having 1 to 30 carbon atoms, or a cycloalkyl group having 3 to 8 carbon atoms which is substituted by 1 to 3 alkyl groups having 1 to 6 carbon atoms. n represents an integer of 1 to 6. Ch represents a chiral group with a valence of n. In the formula (23), at least one of $X^3$ and $X^4$ preferably represents —O—CO—O—, —O—CO—NR—, —NR—CO—O—, or —NR—CO—NR—. In the formula (22), in the case where $P^1$ represents an alkyl group, an acyl group, or a cycloalkyl group, its carbon chain maybe be interrupted by oxygen of an ether functional group, sulfur of a thioether functional group, a non-adjacent imino group, or an alkyl imino group having 1 to 4 carbon atoms.

Examples of the chiral group represented by Ch include atomic groups represented by the following formulae.

[Chem 7]

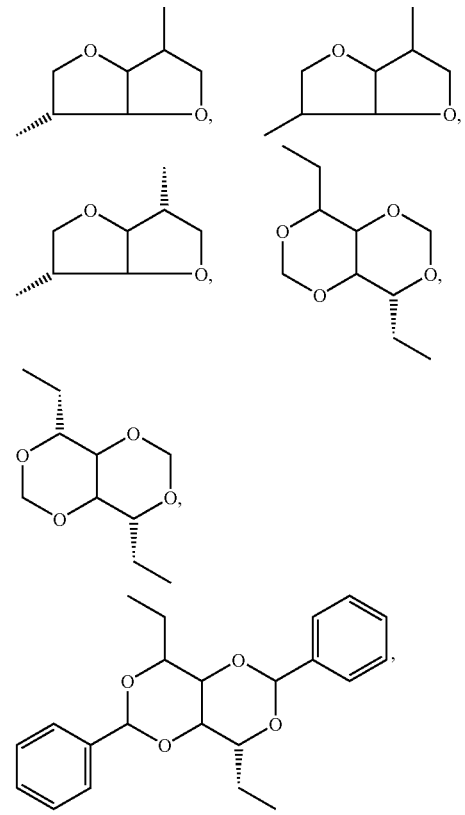

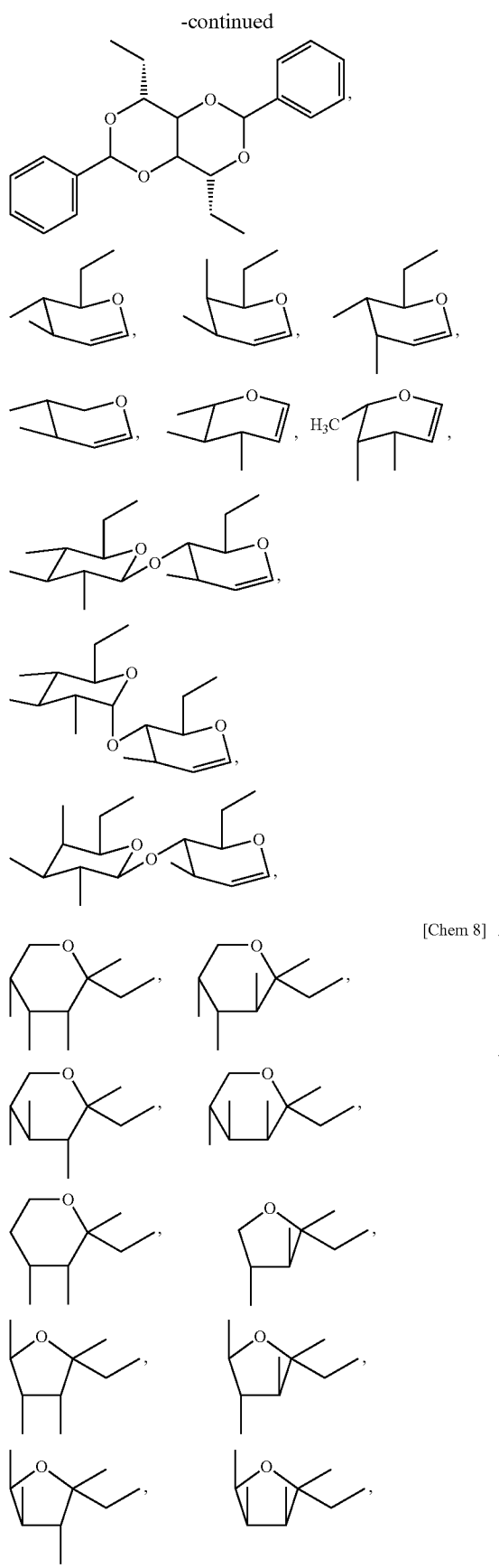

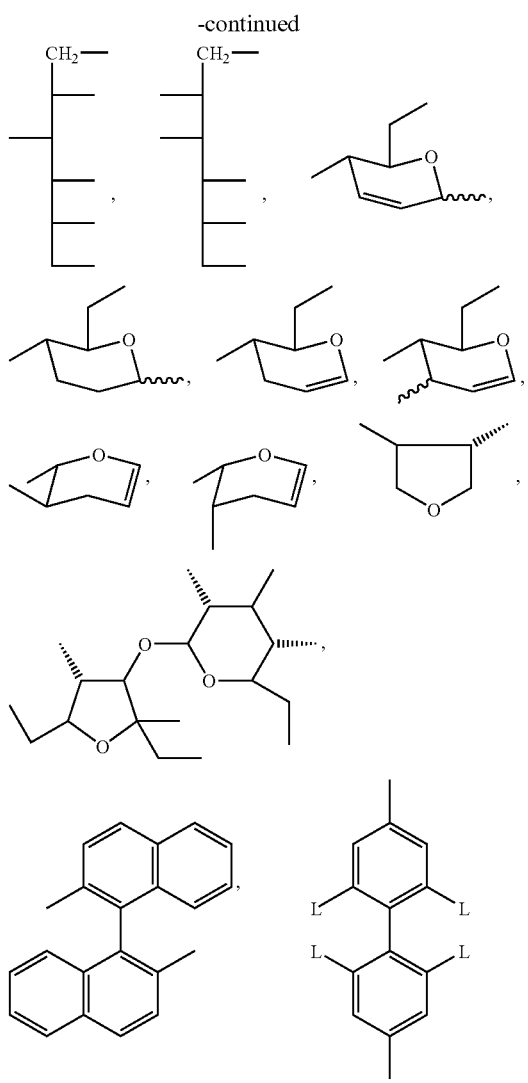

In the atomic groups described above, L represents an alkyl group having 1 to 4 carbon atoms, an alkoxy group having 1 to 4 carbon atoms, a halogen, COOR, OCOR, CONHR, or NHCOR. R represents an alkyl group having 1 to 4 carbon atoms. Note that terminals of the atomic groups represented in the above formulae each represent a bonding hand to an adjacent group.

Of the atomic groups, atomic groups represented by the following formulae are particularly preferred.

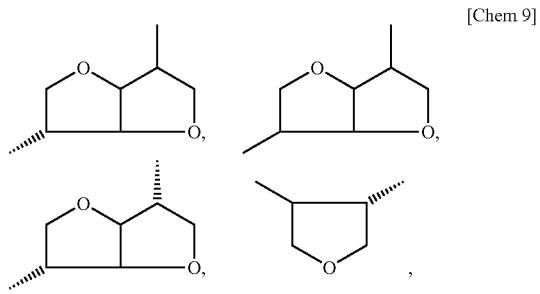

-continued

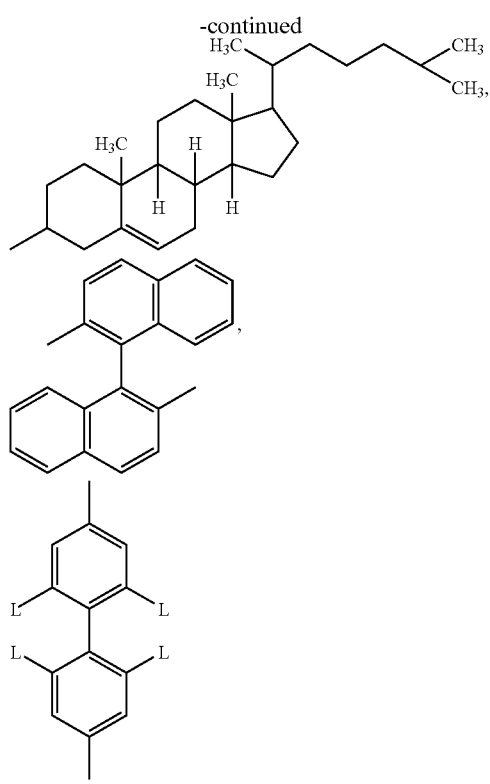

In a preferred example of the chiral compound represented by the above formula (21) or (23): n represents 2; Z represents $H_2C=CH-$; and Ch represents atomic groups represented by the following formulae.

[Chem 10]

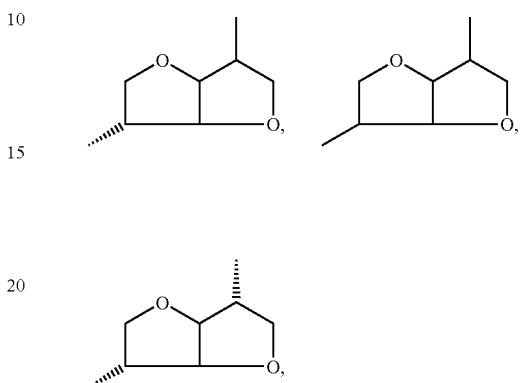

Specific examples of the chiral compound include compounds represented by the following formulae (24) to (44). Note that those chiral compounds each have a torsional force of $1\times10^{-6}$ $nm^{-1}.(wt\%)^{-1}$ or more.

[Chem 11]

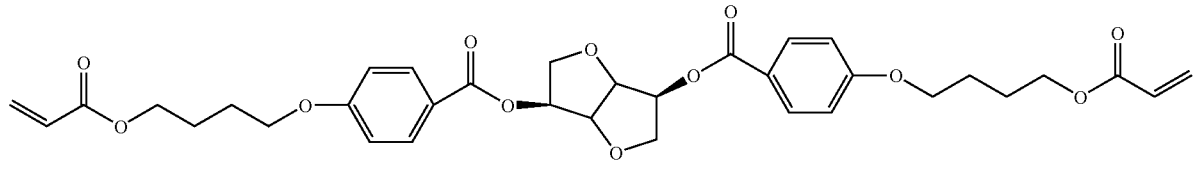

(24)

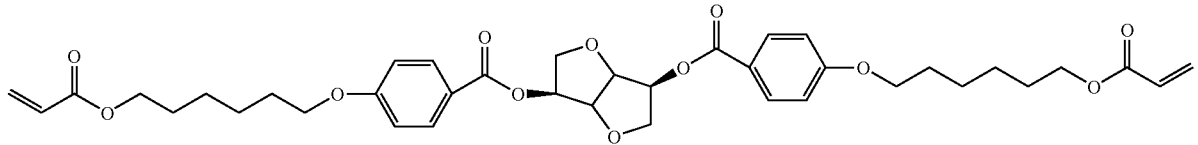

(25)

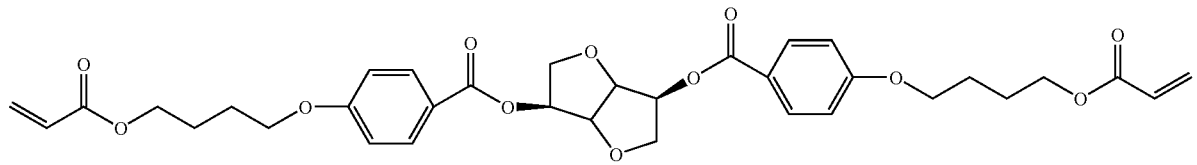

(26)

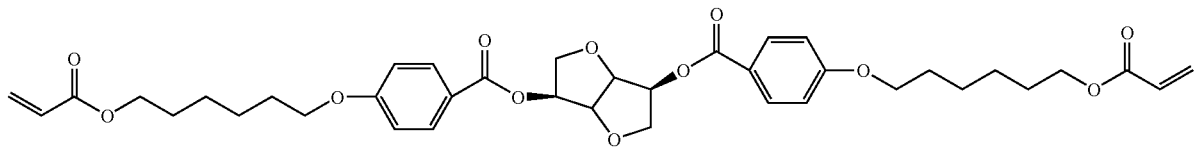

(27)

-continued
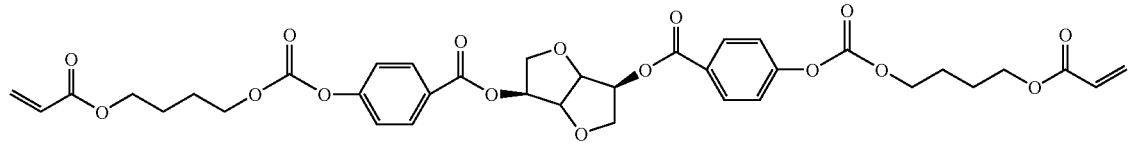
(28)
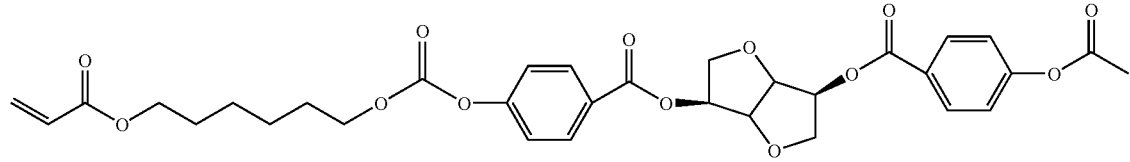
(29)
(30)
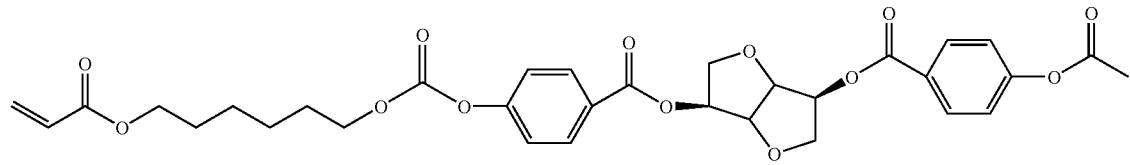
(31)
(32)
(33)
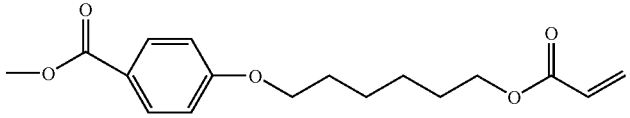

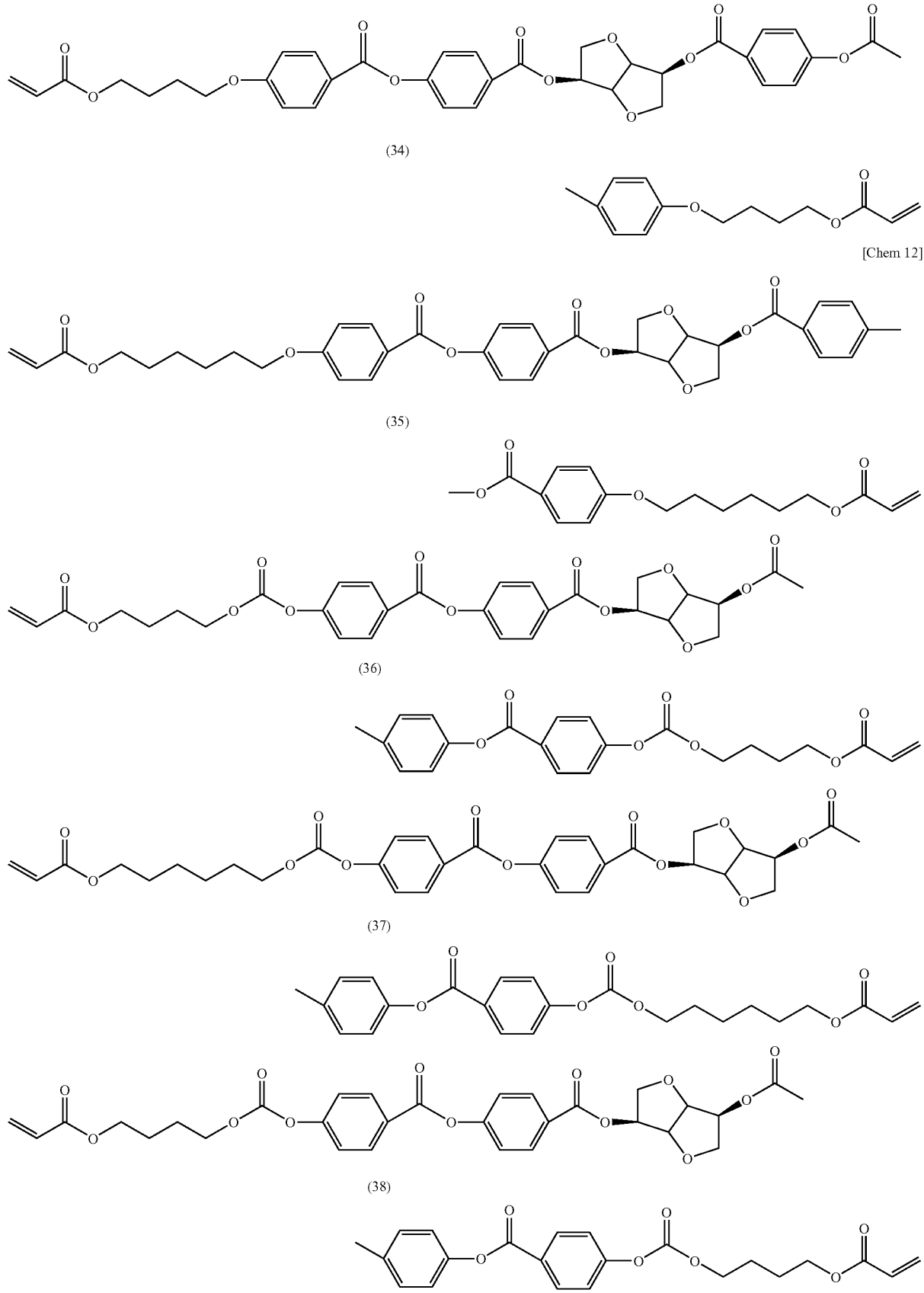

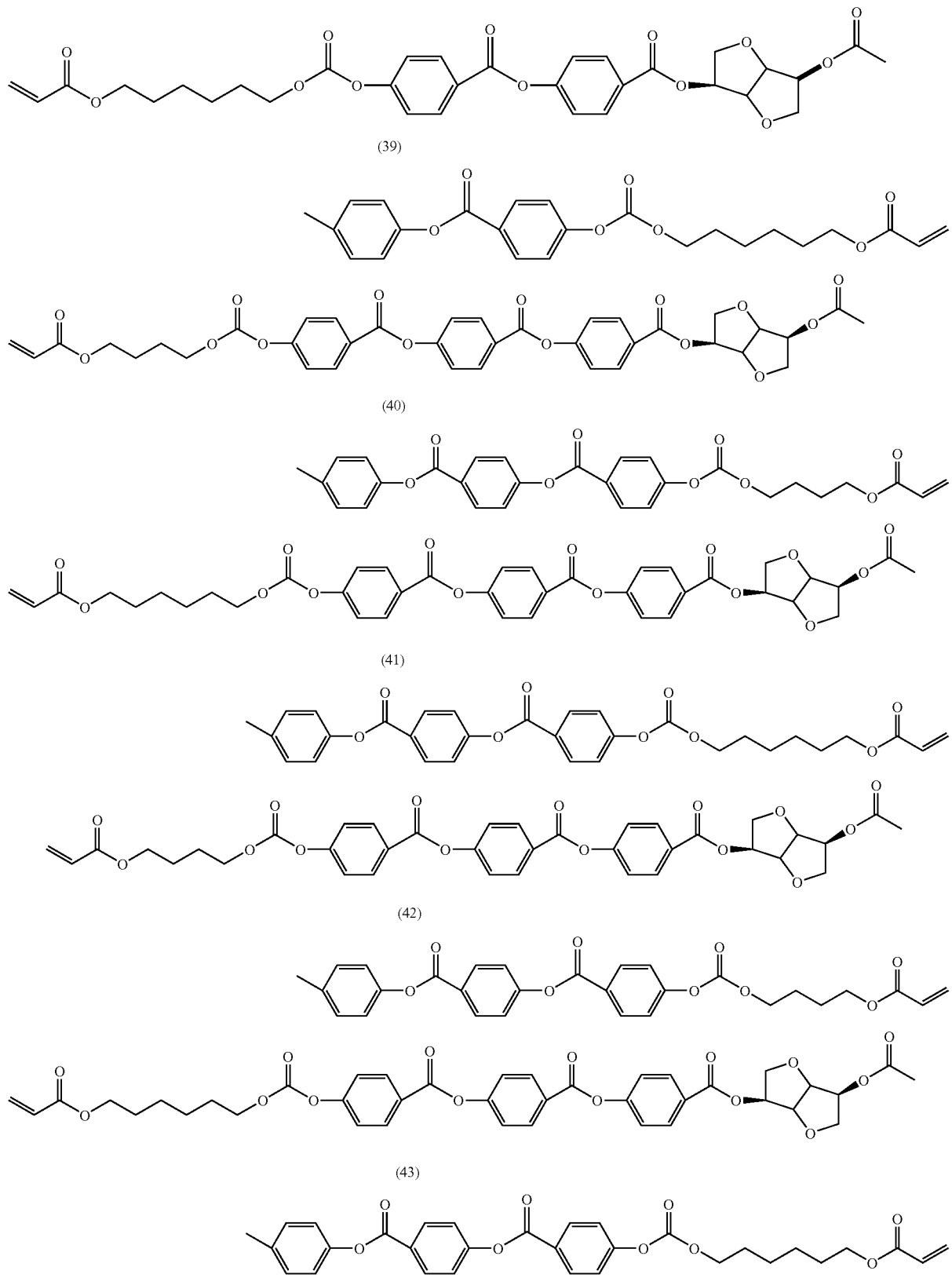

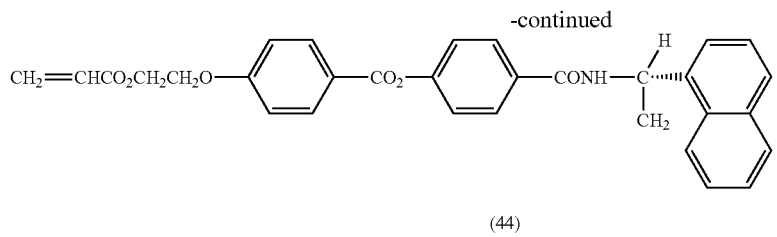

(44)

In addition to the chiral compounds represented above, further examples of the chiral compound include chiral compounds described in RE-A4342280, DE 19520660.6, and DE 19520704.1.

Note that any appropriate combination of the liquid crystal material and the chiral agent may be employed in accordance with the purpose. Particularly typical examples of the combination include: a combination of the liquid crystal monomer represented by the above formula (10)/the chiral agent represented by the above formula (38); and a combination of the liquid crystal monomer represented by the above formula (11)/the chiral agent represented by the above formula (39).

A-4-4. Liquid Crystal Composition Forming Third Optical Compensation Layer (Cholesteric Alignment Fixed Layer): Other Additives The liquid crystal composition capable of forming the third optical compensation layer (cholesteric alignment fixed layer) preferably contains at least one of a polymerization initiator and a crosslinking agent (curing agent). The polymerization initiator and/or the crosslinking agent (curing agent) is used, to thereby favorably fix the cholesteric structure (cholesteric alignment) of the liquid crystal material formed in a liquid crystal state. Any appropriate substance may be used for the polymerization initiator or the crosslinking agent as long as the effect of the present invention can be obtained. Examples of the polymerization initiator include benzoylperoxide (BPO) and azobisisobutyronitrile (AIBN). Examples of the crosslinking agent (curing agent) include a UV-curing agent, a photo-curing agent, and a heat-curing agent. Specific examples thereof include an isocyanate-based crosslinking agent, an epoxy-based crosslinking agent, and a metal chelate crosslinking agent. Such polymerization initiator or crosslinking agent may be used alone or in combination. A content of the polymerization initiator or the crosslinking agent in the liquid crystal composition is preferably 0.1 to 10 wt %, more preferably 0.5 to 8 wt %, and most preferably 1 to 5 wt %. In the case where the content of the polymerization initiator or the crosslinking agent is less than 0.1 wt %, the cholesteric structure may be fixed insufficiently. In the case where the content of the polymerization initiator or the crosslinking agent is more than 10 wt %, the liquid crystal material exhibits a liquid crystal state in a very narrow temperature range and temperature control during formation of an optical compensation layer may involve difficulties.

The liquid crystal composition may further contain any appropriate additive, as required. Examples of the additive include an antioxidant, modifier, surfactant, dye, pigment, discoloration inhibitor, and ultraviolet absorber. Those additives may be used alone or in combination. More specifically, examples of the antioxidant include a phenol-based compound, an amine-based compound, an organic sulfur-based compound, and a phosphine-based compound. Examples of the modifier include glycols, silicones, and alcohols. The surfactant is added, for example, in order to make the surface of an optical compensation layer smooth. Examples of the surfactant that can be used include a silicone-based surfactant, an acrylic surfactant, and a fluorine-based surfactant, and a silicone-based surfactant is particularly preferred.

A-4-5. Method of Forming Third Optical Compensation Layer (Cholesteric Alignment Fixed Layer)

Any appropriate method may be employed for the method of forming the third optical compensation layer (cholesteric alignment fixed layer) as long as the desired cholesteric alignment fixed layer can be obtained. A typical method of forming the third optical compensation layer (cholesteric alignment fixed layer) involves: spreading the liquid crystal composition on a substrate to form a spread layer; subjecting the spread layer to heat treatment such that the liquid crystal material in the liquid crystal composition is aligned in cholesteric alignment; subjecting the spread layer to at least one of polymerization treatment and crosslinking treatment to fix the alignment of the liquid crystal material; and transferring the cholesteric alignment fixed layer formed on the substrate. Hereinafter, a specific procedure for the method of forming the third optical compensation layer is described.

First, a liquid crystal material, a chiral agent, a polymerization initiator or a crosslinking agent, and various additives as required are dissolved or dispersed into a solvent to prepare a liquid crystal application liquid. The liquid crystal material, the chiral agent, the polymerization initiator, the crosslinking agent, and the additive are as described above. A solvent to be used in the liquid crystal application liquid is not particularly limited. Specific example thereof includes: halogenated hydrocarbons such as chloroform, dichloromethane, carbon tetrachloride, dichloroethane, tetrachloroethane, methylene chloride, trichloroethylene, tetrachloroethylene, chlorobenzene, and orthodichlorobenzene; phenols such as phenol, p-chlorophenol, o-chlorophenol, m-cresol, o-cresol, and p-cresol; aromatic hydrocarbons such as benzene, toluene, xylene, methoxybenzene, and 1,2-dimethoxybenzene; ketone-based solvents such as acetone, methylethylketone (MEK), methylisobutylketone, cyclohexanone, cyclopentanone, 2-pyrolidone, and N-methyl-2-pyrolidone; ester-based solvents such as ethyl acetate and butyl acetate; alcohol-based solvents such as t-butyl alcohol, glycerin, ethylene glycol, triethylene glycol, ethylene glycol monomethylether, diethylene glycol dimethylether, propylene glycol, dipropylene glycol, and 2-methyl-2,4-pentanediol; amide-based solvents such as dimethylformamide and dimethylacetoamide; nitrile-based solvents such as acetonitrile and butyronitrile; ether-based solvents such as diethylether, dibutylether, tetrahydroflan, and dioxane; carbon disulfide; ethyl cellosolve; and butyl cellosolve. Of those, toluene, xylene, mesitylene, MEK, methyl isobutylketone, cyclohexanone, ethyl cellosolve, butyl cellosolve, ethyl acetate, butyl acetate, propyl acetate, and ethyl cellosolve acetate are preferred. Those solvents may be used alone or in combination.

A viscosity of the liquid crystal application liquid may vary depending on the content of the liquid crystal material or temperature. For example, in the case where a concentration of the liquid crystal material in the liquid crystal application liquid is 5 to 70 wt % at about room temperature (20 to 30° C.), the viscosity of the application liquid is preferably 0.2 to 20 mPa·s, more preferably 0.5 to 15 mPa·s, and most preferably 1 to 10 mPa·s. To be more specific, in the case where the concentration of the liquid crystal material in the liquid crystal application liquid is 30 wt %, the viscosity of the application liquid is preferably 2 to 5 mPa·s, and more preferably 3 to 4 mPa·s. The application liquid having a viscosity of 0.2 mPa·s or more can favorably prevent generation of liquid drip due to spreading of the application liquid. Further, the application liquid having a viscosity of 20 mPa·s or less can provide an optical compensation layer having very excellent surface smoothness without uneven thickness and excellent application property.

Next, the liquid crystal application liquid is applied onto the substrate to form a spread layer. The method of forming the spread layer may employ any appropriate method (typically, method of fluid spreading the application liquid). Specific examples thereof include a roll coating method, a spin coating method, a wire bar coating method, a dip coating method, an extrusion coating method, a curtain coating method, and a spray coating method. Of those, the spin coating method and the extrusion coating method are preferred from the viewpoint of coating efficiency.

An application amount of the liquid crystal application liquid may appropriately be set in accordance with the concentration of the application liquid, the thickness of the intended layer, and the like. For example, in the case where the concentration of the liquid crystal material in the application liquid is 20 wt %, the application amount is preferably 0.03 to 0.17 ml, more preferably 0.05 to 0.15 ml, and most preferably 0.08 to 0.12 ml per area (100 cm$^2$) of the substrate.

Any appropriate substrate capable of aligning the liquid crystal material may be used as the substrate. Typically, the substrate includes various plastic films. Specific examples of the plastic include cellulose-based plastics such as triacetyl cellulose (TAC), polyolefin such as polyethylene, polypropylene or poly(4-methylpentene-1), polyimide, polyamideimide, polyether imide, polyamide, polyetheretherketone, polyetherketone, polyketone sulfide, polyethersulfone, polysulfone, polyphenylene sulfide, polyphenylene oxide, polyethylene terephthalate, polybutylene terephthalate, polyethylene naphthalate, polyacetal, polycarbonate, polyarylate, an acrylic resin, polyvinyl alcohol, polypropylene, an epoxy resin, and a phenol-resin. Further, a substrate in that a plastic film or sheet as described above is placed on the surface of, for example, a substrate made of metal such as aluminum, copper, or iron, a substrate made of ceramic, or a substrate made of glass can also be used. Furthermore, a substrate obtained by forming an SiO$_2$ oblique evaporation film on the surface of the plastic film or sheet can also be used. The thickness of a substrate is preferably 5 μm to 500 μm, more preferably 10 μm to 200 μm, and most preferably 15 μm to 150 μm. Such thickness provides sufficient strength for a substrate, and thus can prevent the generation of problems, for example, breaking upon manufacture.

Next, the spread layer is subjected to heat treatment to align the liquid crystal material in a state exhibiting a liquid crystal phase. The spread layer contains a chiral agent together with the liquid crystal material, and thus the liquid crystal material provided with torsion in a state exhibiting a liquid crystal phase is aligned. As a result, the spread layer (liquid crystal material forming the spread layer) forms the cholesteric structure (helical structure).

The temperature conditions for the heat treatment may appropriately be set in accordance with the type of liquid crystal material (specifically, temperature at which the liquid crystal material exhibits liquid crystallinity). To be more specific, the heating temperature is preferably 40 to 120° C., more preferably 50 to 100° C., and most preferably 60 to 90° C. A heating temperature of 40° C. or higher generally allows sufficient alignment of the liquid crystal material. A heating temperature of 120° C. or lower expands selection of the substrate in consideration of heat resistance, for example, and thus allows selection of an optimal substrate in accordance with the liquid crystal material. Further, a heating time is preferably 30 seconds or more, more preferably 1 minute or more, particularly preferably 2 minutes or more, and most preferably 4 minutes or more. In the case where a treatment time is less than 30 seconds, the liquid crystal material may not sufficiently exhibit a liquid crystal state. Further, the heating time is preferably 10 minutes or less, more preferably 8 minutes or less, and most preferably 7 minutes or less. In the case where the treatment time is more than 10 minutes, the additives may be sublimed.

Next, the spread layer containing the liquid crystal material exhibiting a cholesteric structure is subjected to at least one of polymerization treatment and crosslinking treatment to fix the alignment (cholesteric structure) of the liquid crystal material. To be more specific, the polymerization treatment is performed, to thereby polymerize the liquid crystal material (polymerizable monomer) and/or chiral agent (polymerizable chiral agent) and fix the polymerizable monomer and/or polymerizable chiral agent as a repeating unit of polymer molecules. Further, the crosslinking treatment is preformed, to thereby form a three-dimensional network structure of the liquid crystal material (crosslinking monomer) and/or chiral agent and fix the crosslinking monomer and/or chiral agent as apart of a crosslinked structure. As a result, an alignment state of the liquid crystal material is fixed. Note that the polymer or three-dimensional network structure to be formed through polymerization or crosslinking of the liquid crystal material is "non-liquid crystalline". The thus-formed third optical compensation layer does not transfer into a liquid crystal phase, glass phase, or crystal phase due to temperature change unique to a liquid crystal compound, for example, and no alignment change due to temperature occurs. As a result, the thus-formed third optical compensation layer may be used as a high performance optical compensation layer not affected by the temperature change. The third optical compensation layer has a selective reflection wavelength region optimized within a range of 100 nm to 320 nm, and thus can significantly suppress light leak and the like.

A specific procedure for the polymerization treatment or crosslinking treatment may appropriately be selected in accordance with the type of polymerization initiator or crosslinking agent to be used. For example, a photo-polymerization initiator or photo-crosslinking agent may be used for photoirradiation. A UV polymerization initiator or UV crosslinking agent may be used for UV irradiation, and heat polymerization initiator or heat crosslinking agent may be used for heating. The irradiation time of light or UV light, the irradiation intensity, the total irradiation amount, and the like may appropriately be set in accordance with the type of liquid crystal material, the type of substrate, properties desired for the third optical compensation layer, and the like. Similarly, the heating temperature, the heating time, and the like may appropriately be set in accordance with the purpose.

The cholesteric alignment fixed layer formed on the substrate as described above is transferred onto a surface of the second optical compensation layer to form the third optical compensation layer. In the case where the third optical compensation layer has a laminate structure of the cholesteric alignment fixed layer and the plastic film layer, the plastic film layer may be attached to the second optical compensation layer-through a pressure-sensitive adhesive layer and the cholesteric alignment fixed layer may be transferred to the plastic layer, to thereby form the third optical compensation layer. Alternatively, the plastic film layer may be attached to the cholesteric alignment fixed layer formed on the substrate through an adhesive layer to form a laminate, and the laminate may be attached to the surface of the second optical compensation layer through a pressure-sensitive adhesive layer. The transfer step further includes peeling the substrate from the third optical compensation layer. The curable adhesive for the adhesive layer is as described in the above section A-3. The plastic film layer is as described in the above section A-4.

The above-mentioned typical example of the method of forming the third optical compensation layer employs a liquid crystal monomer (polymerizable monomer or crosslinking monomer, for example) as the liquid crystal material, but the method of forming the third optical compensation layer of the present invention is not limited to such a method and may be a method which employs a liquid crystalline polymer. However, the method preferably employs a liquid crystal monomer as described above. The liquid crystal monomer may be used, to thereby form an optical compensation layer having an excellent optical compensation function and reduced thickness. To be specific, use of the liquid crystal monomer facilitates control of the selective reflection wavelength region. Further, the viscosity of the application liquid and the like may easily be set by using the liquid crystal monomer, to thereby facilitate formation of a extremely thin third optical compensation layer. Further, the liquid crystal monomer has excellent handling property. In addition, the optical compensation layer to be obtained has even better surface smoothness.

A-5. Polarizer

Any suitable polarizers may be employed as the polarizer 11 in accordance with the purpose. Examples thereof include: a film prepared by adsorbing a dichromatic substance such as iodine or a dichromatic dye on a hydrophilic polymer film such as a polyvinyl alcohol-based film, a partially formalized polyvinyl alcohol-based film, or a partially saponified ethylene/vinyl acetate copolymer-based film and uniaxially stretching the film; and a polyene-based orientation film such as a dehydrated product of a polyvinyl alcohol-based film or a dechlorinated product of a polyvinyl chloride-based film. Of those, a polarizer prepared by adsorbing a dichromatic substance such as iodine on a polyvinyl alcohol-based film and uniaxially stretching the film is particularly preferred because of high polarized dichromaticity. A thickness of the polarizer is not particularly limited, but is generally about 1 to 80 μm.

The polarizer prepared by adsorbing iodine on a polyvinyl alcohol-based film and uniaxially stretching the film may be produced by, for example: immersing a polyvinyl alcohol-based film in an aqueous solution of iodine for coloring; and stretching the film to a 3 to 7 times length of the original length. The aqueous solution may contain boric acid, zinc sulfate, zinc chloride, or the like as required, or the polyvinyl alcohol-based film may be immersed in an aqueous solution of potassium iodide or the like. Further, the polyvinyl alcohol-based film may be immersed and washed in water before coloring as required.

Washing the polyvinyl alcohol-based film with water not only allows removal of contamination or an antiblocking agent on a film surface, but also provides an effect of preventing nonuniformity such as uneven coloring by swelling of the polyvinyl alcohol-based film. The stretching of the film may be performed after coloring of the film with iodine, performed during coloring of the film, or performed followed by coloring of the film with iodine. The stretching may be performed in an aqueous solution of boric acid or potassium iodide, or in a water bath.

A-6. Protective Film

Any suitable protective film which can be used as a protective layer for a polarizer may be employed as the protective film. Specific examples of a material used as a main component of the film include transparent resins such as a cellulose-based resin (such as triacetylcellulose (TAC)), a polyester-based resin, a polyvinyl alcohol-based resin, a polycarbonate-based resin, a polyamide-based resin, a polyimide-based resin, a polyether sulfone-based resin, a polysulfone-based resin, a polystyrene-based resin, a polynorbornene-based resin, a polyolefin-based resin, an acrylic resin, and an acetate-based resin. Another example thereof includes an acrylic, urethane-based, acrylic urethane-based, epoxy-based, or silicone-based thermosetting resin or UV-curing resin. Still another example thereof includes a glassy polymer such as a siloxane-based polymer. Further, a polymer film described in JP2001-343529A (WO 01/37007) may also be used. More specifically, the film in the publication is formed of a resin composition containing a thermoplastic resin having a substituted or unsubstituted imide group on a side chain, and a thermoplastic resin having a substituted or unsubstituted phenyl group and a nitrile group on a side chain. A specific example thereof includes a resin composition containing an alternate copolymer of isobutene and N-methylmaleimide, and an acrylonitrile/styrene copolymer. The polymer film may be an extruded product of the above-mentioned resin composition, for example. Of those, TAC, a polyimide-based resin, a polyvinyl alcohol-based resin and a glassy polymer are preferred. TAC is especially preferred.

It is preferred that the protective film be transparent and have no color. More specifically, the protective film has a thickness direction retardation of preferably −90 nm to +90 nm, more preferably −80 nm to +80 nm, and most preferably −70 nm to +70 nm.

The protective film has any suitable thickness as long as the preferred thickness direction retardation can be obtained. More specifically, the thickness of the protective film is preferably 5 mm or less, more preferably 1 mm or less, especially preferably 1 to 500 μm, and most preferably 5 to 150 μm.

The surface of the protective film arranged at the outer side of the polarizer 11 (that is, the opposite side with respect to the optical compensation layers) may be subjected to hard coat treatment, antireflection treatment, anti-sticking treatment, anti-glare treatment, or the like as required.

A-7. Other Components of Polarizing Plate Provided with Optical Compensation Layers The polarizing plate provided with optical compensation layers of the present invention may further include another optical layer. Any suitable optical layers may be employed as the other optical layer in accordance with the purpose or the type of image display. Specific examples of the other optical layer include a liquid crystal film, a light scattering film, a diffraction film and other optical compensation layer (retardation film).

The polarizing plate provided with optical compensation layers of the present invention may further include a sticking layer as an outermost layer on at least one side. Inclusion of the sticking layer as an outermost layer facilitates lamination of the polarizing plate with other members (such as liquid crystal cell), to thereby prevent peeling off of the polarizing plate from other members. Any suitable materials may be employed as a material for the sticking layer. Specific examples of the material include the pressure sensitive adhesive described in the section A-2, and the adhesive described in the section A-3. A material having excellent humidity resistance and thermal resistance is preferably used in view of preventing foaming or peeling due to moisture absorption, degradation of optical characteristics and warping of a liquid crystal cell due to difference in thermal expansion, and the like.

For practical purposes, the surface of the sticking layer is covered with an appropriate separator until the polarizing plate is actually used, to thereby prevent contamination. The separator may be formed by providing a release coating on any suitable film by using a silicone-based, long-chain alkyl-based, fluorine-based, or molybdenum sulfide release agent, for example.

Each layer of the polarizing plate provided with optical compensation layers of the present invention may be provided with UV absorbability through treatment with a UV absorber such as a salicylate-based compound, a benzophenone-based compound, a benzotriazole-based compound, a cyanoacrylate-based compound, or a nickel complex salt-based compound.

B. Method of Producing Polarizing Plate

The polarizing plate provided with optical compensation layers of the present invention may be produced by laminating the above-mentioned layers through the above-mentioned adhesive layer or pressure-sensitive adhesive layer. Any appropriate laminating method may be employed as long as the optical axes of the respective layers form angles (angles $\alpha$, $\beta$, and $\gamma$) within the above ranges. For example, the polarizer, the first optical compensation layer, the second optical compensation layer, and the third optical compensation layer may be punched out into predetermined sizes, aligned so as to form the angles $\alpha$, $\beta$, and $\gamma$ described above, and laminated through an adhesive or a pressure-sensitive adhesive.

C. Use of Polarizing Plate

The polarizing plate provided with optical compensation layers of the present invention may be suitably used for various image displays (such as liquid crystal display and selfluminous display). Specific examples of the image display for which the polarizing plate provided with optical compensation layers may be used include a liquid crystal display, an EL display, a plasma display (PD), and a field emission display (FED). The polarizing plate provided with optical compensation layers of the present invention used for a liquid crystal display is useful for viewing angle compensation, for example. The polarizing plate provided with optical compensation layers of the present invention is used for a liquid crystal display of a circularly polarization mode, and is particularly useful for a homogeneous alignment TN liquid crystal display, an in-plane switching (IPS) liquid crystal display, and a vertical alignment (VA) liquid crystal display. The polarizing plate provided with optical compensation layers of the present invention used for an EL display is useful for prevention of electrode reflection, for example.

D. Image Display Apparatus

Figure 3:
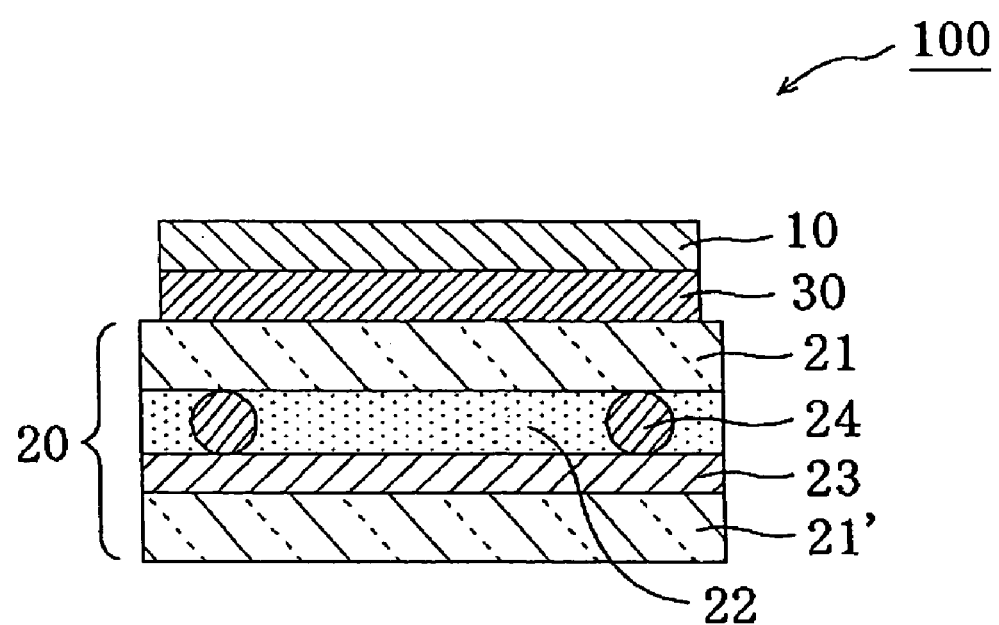
FIG. 3 A schematic sectional view of a liquid crystal display panel to be used for a liquid crystal display apparatus according to a preferred embodiment of the present invention.

A liquid crystal display apparatus is described as an example of the image display apparatus of the present invention. A liquid crystal panel to be used for the liquid crystal display apparatus is described. Other structure of the liquid crystal display apparatus may employ any appropriate structure in accordance with the purpose. In the present invention, a liquid crystal display apparatus of VA mode is preferred, and a liquid crystal display apparatus of reflective or semi-transmissive VA mode is particularly preferred. FIG. 3 is a schematic sectional view of a liquid crystal panel according to a preferred embodiment of the present invention. A liquid crystal panel for a reflective liquid crystal display apparatus is described with reference to FIG. 3. A liquid crystal panel 100 is provided with: a liquid crystal cell 20; a retardation plate 30 arranged on an upper side of the liquid crystal cell 20; and a polarizing plate 10 arranged on an upper side of the retardation plate 30. The retardation plate 30 may employ any appropriate retardation plate in accordance with the purpose and the alignment mode of the liquid crystal cell. The retardation plate 30 may be omitted in accordance with the purpose and the alignment mode of the liquid crystal cell. The polarizing plate 10 refers to the polarizing plate provided with optical compensation layers of the present invention described in the above sections A and B. The liquid crystal cell 20 includes: a pair of glass substrates 21 and 21'; and a liquid crystal layer 22 as a display medium arranged between the substrates. A reflecting electrode 23 is provided on a liquid crystal layer side of the lower substrate 21', and color filters (not shown) are provided on the upper substrate 21. A distance (cell gap) between the substrates 21 and 21' is controlled by a spacer 24.

In the liquid crystal display apparatus 100 of reflective VA mode, for example, liquid crystal molecules are aligned vertically to surfaces of the substrates 21 and 21' under no voltage application. Such vertical alignment may be realized by arranging nematic liquid crystals having negative dielectric anisotropy between substrates each having formed thereon a vertically aligned film (not shown). Linear polarized light allowed to pass through the polarizing plate 10 from a surface of the upper substrate 21 entering the liquid crystal layer 22 in such a state advances along long axes of vertically aligned liquid crystal molecules. No birefringence generates in a long axis direction of the liquid crystal molecules such that incident light advances without changing a polarization direction. The light is reflected by the reflecting electrode 23, is allowed to pass through the liquid crystal cell 22, and exits from the upper substrate 21. A polarization state of the exiting light is the same as that of the incident light, and the exiting light is allowed to pass through the polarizing plate 10, to thereby provide light display. Long axes of the liquid crystal molecules align parallel to the surfaces of the substrates under voltage application between electrodes. The liquid crystal molecules exhibit birefringence with respect to linear polarized light entering the liquid crystal layer 22 in such a state, and the polarization state of incident light varies depending on inclination of the liquid crystal molecules. Light reflected by the reflecting electrode 23 and exiting from the upper substrate under application of a predetermined maximum voltage rotates its polarization direction by 90° into linear polarized light, for example, and is absorbed by the polarizing plate 10, to thereby provide dark display. Return to a state under no voltage application provides light display again by alignment control force. The inclination of the liquid crystal molecules may be controlled by varying an application voltage to change an intensity of transmitted light from the polarizing plate 10, to thereby provide gradation display.

Hereinafter, the present invention is described more specifically by way of examples. However, the present invention is not limited to the examples. Methods of measuring properties in examples are described below.

(1) Measurement of Thickness

The thickness of each of the polarizing plates provided with optical compensation layers of Examples and Comparative Examples was measured by using Dial Gauge manufactured by Ozaki Mfg. Co., Ltd.

(2) Measurement of Uneven Display Due to Heat

Each of the polarizing plates provided with optical compensation layers obtained in Examples and Comparative Examples was attached to the same polarizing plate provided with optical compensation layers, to thereby prepare a measurement sample. The polarizing plates provided with optical compensation layers were attached together such that absorption axes of the respective polarizers were perpendicular to each other and that the respective third optical compensation layers opposed each other. This measurement sample was placed on backlight, and an image illuminated with backlight was photographed with a digital camera. The photographed image was grayed (256 gradation) by using Win Roof v3.0 manufactured by Mitani Corporation. The 35th gradation level of 0 to 255 brightness gradation levels was used as a threshold, and the gradation levels was binarized into 0 to 35 gradation levels as white and 35 to 255 gradation levels as black. A ratio of white in the image was represented by %. The measurement sample was heated at 85° C. for 10 minutes, and the ratio of white before and after heating was measured. The change in the ratio of white was determined, and a small change indicated little uneven display due to heat.

(3) Measurement of Transmittance

Each of the polarizing plates provided with optical compensation layers obtained in Examples and Comparative Examples was attached to the same polarizing plate provided with optical compensation layers, to thereby prepare a measurement sample. The polarizing plates provided with optical compensation layers were attached together such that absorption axes of the respective polarizers were perpendicular to each other and that the respective third optical compensation layers opposed each other. The transmittance of the measurement sample was measured by using DOT-3, trade name, manufactured by Murakami Color Research Laboratory.

EXAMPLE 1

(Production of Polarizer)

A commercially available polyvinyl alcohol (PVA) film (available from Kuraray Co., Ltd.) was colored in an aqueous solution containing iodine and uniaxially stretched to about a 6 times length between rolls having different speed ratios in an aqueous solution containing boric acid, to thereby obtain a continuous polarizer. A commercially available TAC film (available from Fuji Photo Film Co., Ltd.) was attached to each side of the polarizer by using a PVA-based adhesive, to thereby obtain a polarizing plate (protective film/polarizer/protective film) having a total thickness of 100 μm. This polarizing plate was punched out into length of 20 cm and width of 30 cm such that an absorption axis of the polarizer was set in a longitudinal direction.

(Production of First Optical Compensation Layer)

A continuous norbornene-based resin film (trade name, Zeonoa, available from Zeon Corporation, thickness of 60 μm, photoelastic coefficient of $3.10 \times 10^{-12}$ m²/N) was uniaxially stretched to a 1.90 times length at 140° C., to thereby produce a continuous film for a first optical compensation layer. This film had a thickness of 45 μm and an in-plane retardation $Re_1$ of 270 nm. This film was punched out into length of 20 cm and width of 30 cm such that its slow axis was set in a longitudinal direction.

(Production of Second Optical Compensation Layer)

A continuous norbornene-based resin film (trade name, Zeonoa, available from Zeon Corporation, thickness of 60 μm, photoelastic coefficient of $3.10 \times 10^{-12}$ m²/N) was uniaxially stretched to a 1.32 times length at 140° C., to thereby produce a continuous film for a second optical compensation layer. This film had a thickness of 50 μm and an in-plane retardation $Re_2$ of 140 nm. This film was punched out into length of 20 cm and width of 30 cm such that its slow axis was set in a longitudinal direction.

(Production of Third Optical Compensation Layer)

90 parts by weight of a nematic liquid crystal compound represented by the following formula (10), 10 parts by weight of a chiral agent represented by the following formula (38), 5 parts by weight of a photo-polymerization initiator (Irgacure 907, available from Ciba Specialty Chemicals), and 300 parts by weight of methyl ethyl ketone were mixed uniformly, to thereby prepare a liquid crystal application liquid. This liquid crystal application liquid was used to coat a substrate (biaxially stretched PET film), subjected to heat treatment at 80° C. for 3 minutes, and subjected to polymerization treatment by irradiating the liquid crystal application liquid with UV light, to thereby form a third optical compensation layer. The substrate having the third optical compensation layer formed thereon was punched out into length of 20 cm×width of 30 cm. The third optical compensation layer had a thickness of 2 μm, an in-plane retardation $Re_3$ of 0 nm, and a thickness direction retardation $Rth_3$ of 110 nm.

[Chem 13]

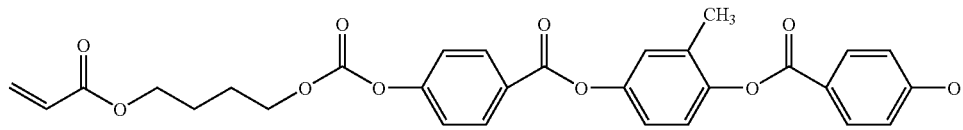

(10)

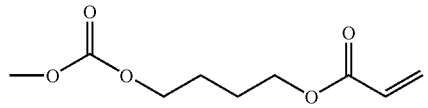

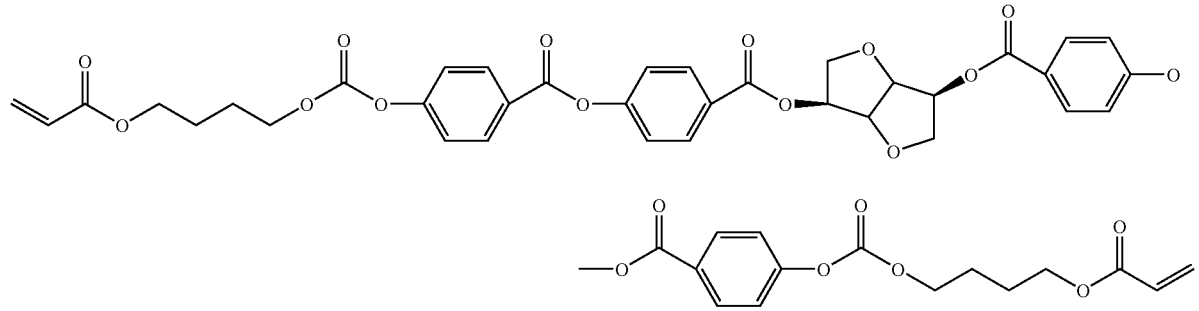

(38)

(Production of Polarizing Plate Provided With Optical Compensation Layers)

The polarizing plate, first optical compensation layer, second optical compensation layer, and third optical compensation layer obtained above were laminated in the stated order. The lamination was performed such that the slow axes of the first optical compensation layer, second optical compensation layer, and third optical compensation layer were at 15°, 75°, and 75°, respectively, in a counterclockwise direction with respect to the absorption axis of the polarizer of the polarizing plate. The polarizer and the first optical compensation layer, and the first optical compensation layer and the second optical compensation layer were laminated by using an acrylic pressure-sensitive adhesive (thickness of 20 µm). The second optical compensation layer and the third optical compensation layer were laminated by using an isocyanate-based curable adhesive (thickness of 5 µm). Next, the substrate (biaxially stretched PET film) supporting the third optical compensation layer was peeled off, and an acrylic pressure-sensitive adhesive (thickness of 20 µm) was applied to the peeled surface for attaching the liquid crystal cell thereto. Finally, the resultant was punched out into length of 4.0 cm and width of 5.3 cm, to thereby obtain a polarizing plate provided with optical compensation layers as shown in FIG. 1.

The obtained polarizing plate provided with optical compensation layers was measured for thickness, transmittance, and uneven display due to heat. Table 1 shows the results together with the results of Examples 2 and 3 and Comparative Examples 1 to 3 described below.

TABLE 1

| | | | Uneven display due to heat | | |
| | Thickness (µm) | Transmittance (%) | Before heating (%) | After heating (%) | Change amount (%) |
| --- | --- | --- | --- | --- | --- |
| Example 1 | 262 | 0.10 | 0.21 | 1.55 | 1.34 |
| Example 2 | 340 | 0.10 | 7.53 | 12.18 | 4.65 |
| Example 3 | 322 | 0.10 | 0.25 | 1.60 | 1.35 |
| Comparative example 1 | 262 | 0.85 | 1.22 | 2.60 | 1.38 |
| Comparative example 2 | 262 | 0.80 | 1.28 | 2.70 | 1.42 |
| Comparative example 3 | 340 | 0.85 | 8.02 | 12.54 | 4.52 |

EXAMPLE 2

The polarizing plate, the first optical compensation layer, and the second optical compensation layer were produced in the same manner as in Example 1.

(Production of Third Optical Compensation Layer)

A continuous norbornene-based film (trade name, Arton, available from JSR Corporation, thickness of 100 µm, photoelastic coefficient of $5.00 \times 10^{-12}$ m$^2$/N) was longitudinally stretched to an about 1.27 times length at 175° C. and then transversely stretched to an about 1.37 times length at 176° C., to thereby produce a continuous film (thickness of 65 µm) for a third optical compensation layer. This film was punched out into length of 20 cm and width of 30 cm, to thereby form a third optical compensation layer. The third optical compensation layer had an in-plane retardation $Re_3$ of 0 nm and a thickness direction retardation $Rth_3$ of 110 nm.

(Production of Polarizing Plate Provided with Optical Compensation Layers)

A polarizing plate provided with optical compensation layers as shown in FIG. 1 was produced in the same manner as in Example 1 except that the second optical compensation layer and the third optical compensation layer were laminated by using an acrylic pressure-sensitive adhesive (thickness of 20 µm). The obtained polarizing plate provided with optical compensation layers was subjected to the same evaluation as that of Example 1. Table 1 shows the results.

EXAMPLE 3

The polarizing plate, the first optical compensation layer, and the second optical compensation layer were produced in the same manner as in Example 1.

The liquid crystal application liquid prepared in the same manner as in Example 1 was used to coat a substrate (biaxially stretched PET film), subjected to heat treatment at 80° C. for 3 minutes, and subjected to polymerization treatment by irradiating the liquid crystal application liquid with UV light, to thereby form a cholesteric alignment fixed layer (thickness of 2 µm). Next, an isocyanate-based curable adhesive (thickness of 5 µm) was applied to the cholesteric alignment fixed layer, and a plastic film layer (TAC film, thickness of 40 µm) was attached thereto through the adhesive, to thereby form a third optical compensation layer. The third optical compensation layer was punched out into length of 20 cm and width of 30 cm. The third optical compensation layer had a thickness of 47 μm, an in-plane retardation $Re_3$ of 0 nm, and a thickness direction retardation $Rth_3$ of 140 nm.

The polarizer, the first optical compensation layer, the second optical compensation layer, and the third optical compensation layer were laminated in the stated order in the same manner as in Example 1, to thereby obtain a polarizing plate provided with optical compensation layers as shown in FIG. 1 except that the second optical compensation layer and the third optical compensation layer were laminated through an acrylic pressure-sensitive adhesive (thickness of 20 μm). At this time, the second optical compensation layer and the third optical compensation layer were laminated such that the plastic film layer (TAC film) of the third optical compensation layer opposed the second optical compensation layer. The obtained polarizing plate provided with optical compensation layers was subjected to the same evaluation as that of Example 1. Table 1 shows the results.

COMPARATIVE EXAMPLE 1

A polarizing plate provided with optical compensation layers was produced in the same manner as in Example 1 except that the slow axis of the first optical compensation layer was at 35° in a counterclockwise direction with respect to the absorption axis of the polarizer of the polarizing plate. The obtained polarizing plate provided with optical compensation layers was subjected to the same evaluation as that of Example 1. Table 1 shows the results.

COMPARATIVE EXAMPLE 2

A polarizing plate provided with optical compensation layers was produced in the same manner as in Example 1 except that the slow axis of the second optical compensation layer was at 35° in a counterclockwise direction with respect to the absorption axis of the polarizer of the polarizing plate. The obtained polarizing plate provided with optical compensation layers was subjected to the same evaluation as that of Example 1. Table 1 shows the results.

COMPARATIVE EXAMPLE 3

A polarizing plate provided with optical compensation layers was produced in the same manner as in Example 2 except that the slow axis of the first optical compensation layer was at 35° in a counterclockwise direction with respect to the absorption axis of the polarizer of the polarizing plate. The obtained polarizing plate provided with optical compensation layers was subjected to the same evaluation as that of Example 1. Table 1 shows the results.

Table 1 revealed the following. In Examples of the present invention, angles between the slow axes of the first optical compensation layer, second optical compensation layer, and third optical compensation layer, and the absorption axis of the polarizer were set within a predetermined range, and thus transmittance in a crossed nicols state was greatly reduced. That is, light leak in black display was favorably prevented. Meanwhile, in Comparative Examples, at least one angle formed between the slow axes of the optical compensation layers and the absorption axis of the polarizer depart from the predetermined range, and thus the transmittance in a crossed nicols state was very large. That is, light leak in black display was extremely significant and not at practical level. Further, in Comparative Examples, at least one angle formed between the slow axes of the optical compensation layers and the absorption axis of the polarizer depart from the predetermined range, and a high value was obtained from an initial value in the test of uneven display due to heat. A comparison between Examples 1 and 3, and Example 2 reveals that the cholesteric alignment fixed layer is employed as the third optical compensation layer, to thereby prevent both light leak and uneven display due to heat. Further, use of the isocyanate-based curable adhesive for lamination of the third optical compensation layer actually confirmed favorable prevention of formation of cracks in the third optical compensation layer during heating.

INDUSTRIAL APPLICABILITY

The polarizing plate provided with optical compensation layers of the present invention may suitably be used for various image display apparatuses (such as a liquid crystal display apparatus and a self-luminous display apparatus).

The invention claimed is:

1. A polarizing plate provided with optical compensation layers comprising a polarizer, a first optical compensation layer, a second optical compensation layer, and a third optical compensation layer in the stated order, wherein:
    the first optical compensation layer contains a resin having an absolute value of photoelastic coefficient of $2 \times 10^{-11}$ $m^2/N$ or less, and has a relationship of $nx>ny=nz$ and an in-plane retardation $Re_1$ of 200 to 300 nm;
    the second optical compensation layer contains a resin having an absolute value of photoelastic coefficient of $2 \times 10^{-11}$ $m^2/N$ or less, and has a relationship of $nx>ny=nz$ and an in-plane retardation $Re_2$ of 90 to 160 nm;
    the third optical compensation layer has a relationship of $nx=ny>nz$, an in-plane retardation $Re_3$ of 0 to 20 nm, and a thickness direction retardation $Rth_3$ of 30 to 300 nm;
    an absorption axis of the polarizer and a slow axis of the first optical compensation layer form an angle of 10° to 30°;
    the absorption axis of the polarizer and a slow axis of the second optical compensation layer form an angle of 70° to 95°; and
    the absorption axis of the polarizer and a slow axis of the third optical compensation layer form an angle of 70° to 95°.

2. A polarizing plate provided with optical compensation layers according to claim 1, wherein the third optical compensation layer has a thickness of 1 to 50 μm.

3. A polarizing plate provided with optical compensation layers according to claim 2, wherein the third optical compensation layer is formed of a cholesteric alignment fixed layer having a selective reflection wavelength region of 350 nm or less.

4. A polarizing plate provided with optical compensation layers according to claim 2, wherein the third optical compensation layer includes a layer formed of a film having a relationship of $nx=ny>nz$ and containing a resin having an absolute value of photoelastic coefficient of $2 \times 10^{-11}$ $m^2/N$ or less and a cholesteric alignment fixed layer having a selective reflection wavelength region of 350 nm or less.

5. A liquid crystal panel comprising the polarizing plate provided with optical compensation layers according to claim 2, and a liquid crystal cell.

6. A liquid crystal panel according to claim 5, wherein the liquid crystal cell is of reflective or semi-transmissive VA mode.

7. An image display apparatus comprising the polarizing plate provided with optical compensation layers according to claim 2.

8. A polarizing plate provided with optical compensation layers according to claim 1, wherein the third optical compensation layer is formed of a cholesteric alignment fixed layer having a selective reflection wavelength region of 350 nm or less.

9. A liquid crystal panel comprising the polarizing plate provided with optical compensation layers according to claim 8, and a liquid crystal cell.

10. A liquid crystal panel according to claim 9, wherein the liquid crystal cell is of reflective or semi-transmissive VA mode.

11. An image display apparatus comprising the polarizing plate provided with optical compensation layers according to claim 8.

12. A polarizing plate provided with optical compensation layers according to claim 1, wherein the third optical compensation layer includes a layer formed of a film having a relationship of nx=ny>nz and containing a resin having an absolute value of photoelastic coefficient of $2\times10^{-11}$ m$^2$/N or less and a cholesteric alignment fixed layer having a selective reflection wavelength region of 350 nm or less.

13. A liquid crystal panel comprising the polarizing plate provided with optical compensation layers according to claim 12, and a liquid crystal cell.

14. A liquid crystal panel according to claim 13, wherein the liquid crystal cell is of reflective or semi-transmissive VA mode.

15. An image display apparatus comprising the polarizing plate provided with optical compensation layers according to claim 12.

16. A liquid crystal panel comprising the polarizing plate provided with optical compensation layers according to claim 1, and a liquid crystal cell.

17. A liquid crystal panel according to claim 16, wherein the liquid crystal cell is of reflective or semi-transmissive VA mode.

18. A liquid crystal display apparatus comprising the liquid crystal panel according to claim 17.

19. A liquid crystal display apparatus comprising the liquid crystal panel according to claim 16.

20. An image display apparatus comprising the polarizing plate provided with optical compensation layers according to claim 1.

* * * * *